(12) United States Patent
Kondo et al.

(10) Patent No.: US 6,390,949 B1
(45) Date of Patent: May 21, 2002

(54) APPARATUS FOR CONTROLLING FRICTIONAL COUPLING DEVICE TO EFFECT VEHICLE TRANSMISSION UPSHIFT WHILE ACCELERATOR PEDAL IS NOT IN OPERATION

(75) Inventors: Masami Kondo, Toyota; Yasunari Nakamura, Nagoya, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/642,018

(22) Filed: Aug. 21, 2000

(30) Foreign Application Priority Data

Aug. 27, 1999 (JP) .......................................... 11-241790

(51) Int. Cl.[7] .............................................. F16H 61/06
(52) U.S. Cl. ...................... 477/143; 477/109; 477/154; 477/158
(58) Field of Search ................................ 477/109, 143, 477/154, 155, 158, 163

(56) References Cited

U.S. PATENT DOCUMENTS

| 5,129,286 A | * | 7/1992 | Nitz et al. ................... 477/109 |
| 5,468,198 A | * | 11/1995 | Holbrook et al. ............ 477/143 |
| 5,514,047 A | * | 5/1996 | Tibbles et al. ................. 477/46 |
| 5,647,819 A | | 7/1997 | Fujita et al. .................. 477/140 |
| 5,730,683 A | * | 3/1998 | Usuki et al. .................. 477/143 |
| 5,961,421 A | | 10/1999 | Hoshiya et al. .............. 477/140 |
| 6,019,699 A | | 2/2000 | Hoshiya et al. ................ 477/20 |
| 6,155,948 A | | 12/2000 | Gierer ......................... 475/123 |

FOREIGN PATENT DOCUMENTS

| EP | 0482690 | 4/1992 |
| JP | 9-170654 | 6/1997 |
| JP | 9-295526 | 11/1997 |

* cited by examiner

Primary Examiner—Sherry Estremsky
(74) Attorney, Agent, or Firm—Oblon, Spivak, McClelland, Maier & Neustadt, P.C.

(57) ABSTRACT

An apparatus for controlling a vehicle automatic transmission, wherein a moment at which the supply of a pressurized fluid to a hydraulic cylinder for engagement of a frictional coupling device to effect an upshift of the transmission during running of the vehicle in a power-off state is initiated is determined by comparing an estimated synchronizing time required for the transmission input speed to reach a synchronizing speed of a higher-gear position to which the transmission is shifted, with a stored predetermined stroking time required for the piston of the hydraulic cylinder to reach its engaging stroke end.

10 Claims, 24 Drawing Sheets

FIG. 2

|     | C0 | C1 | C2 | B0 | B1 | B2 | B3 | B4 | F0 | F1 | F2 |
|-----|----|----|----|----|----|----|----|----|----|----|----|
| N   |    | ○  |    |    |    |    |    |    |    |    |    |
| Rev |    |    | ○  | ○  |    |    |    | ○  |    |    |    |
| 1st | ○  | ○  |    |    |    |    |    | ●  | ○  |    | ○  |
| 2nd | ●  | ○  |    |    |    |    | ○  |    | ○  |    |    |
| 3rd | ○  | ○  |    |    | ●  | ○  |    |    | ○  | ○  |    |
| 4th | ○  | ○  | ○  |    |    | △  |    |    | ○  |    |    |
| 5th |    | ○  | ○  | ○  |    | △  |    |    |    |    |    |

APPARATUS FOR CONTROLLING FRICTIONAL COUPLING DEVICE TO EFFECT VEHICLE TRANSMISSION UPSHIFT WHILE ACCELERATOR PEDAL IS NOT IN OPERATION

This application is based on Japanese Patent Application No. 11-241790 filed Aug. 27, 1999, the content of which is incorporated hereinto by reference.

BACKGROUND OF THE INVENTION

1. Field of the Invention

The present invention relates in general to a control apparatus for an automatic transmission of an automotive vehicle, and more particularly to an upshift of the automatic transmission while the vehicle is running in a power-off state.

2. Discussion of the Related Art

There is widely known a power transmitting system for an automotive vehicle, which includes (a) an automatic transmission which is shifted up from a presently established lower-gear position to a higher-gear position having a lower speed ratio than the presently established lower-gear position, by an engaging action of a frictional coupling device by the corresponding hydraulic cylinder, and (b) a hydraulic control device for supplying a pressurized fluid to the hydraulic cylinder to effect the engaging action of the frictional coupling device. JP-A-9-295526 discloses an example of such a power transmitting system including a control apparatus adapted to limit the output of an engine of the vehicle until an upshift of the automatic transmission is completed, where an accelerator pedal is operated in the process of that upshift which was initiated during running of the vehicle with the accelerator pedal placed in the non-operated position. JP-A-9-170654 discloses a power transmitting system including a control apparatus having a pressure regulating device which is adapted to control the pressure of the pressurized fluid to be supplied to the above-indicated hydraulic cylinder such that the fluid pressure is changed at a suitable rate in the process of an upshift of the automatic transmission, or such that the fluid pressure is feedback-controlled so as to change the input speed of the automatic transmission at a suitable rate.

The conventional control apparatus for such power transmitting systems for a motor vehicle is not satisfactory in the control of an upshift of the automatic transmission. For example, the drivability of the vehicle is deteriorated if the engine output is limited until the upshift is completed, where the accelerator pedal is operated in the process of the upshift. If the frictional coupling device is engaged only after the accelerator pedal is subsequently released to its non-operated position, an engine brake may be applied to the vehicle with a result of the vehicle deceleration unexpectedly to the vehicle operator. In the absence of the pressure regulating device indicated above, the moment at which the frictional coupling device has been engaged would tend to differ from the moment at which the input speed of the automatic transmission has reached the synchronizing speed of the higher-gear position. If the generation of the engaging force of the frictional coupling device is initiated before the input speed has reached the synchronizing speed, the vehicle tends to be accelerated unexpectedly to the vehicle operator. If the generation of the engaging force is initiated after the input speed has reached the synchronizing speed, the vehicle tends to be decelerated unexpectedly to the vehicle operator. The latter deceleration is remarkable particularly where the speed of the vehicle drive power source (e.g., engine speed) is raised by an engine braking effect. Even where this engine speed rise is restricted by a one-way clutch which allows the engine speed to be lowered, the vehicle may be unexpectedly decelerated due to a change in the rotating speed of the rotary members of the automatic transmission.

SUMMARY OF THE INVENTION

It is accordingly an object of the present invention to provide a control apparatus for an automatic transmission of an automotive vehicle, which permits an improved control of an upshift of the automatic transmission during running of the vehicle with the accelerator pedal placed in the non-operated position, more particularly, a control apparatus which, in the absence of the above-indicated pressure regulating device, permits adequate engagement of the frictional coupling device in a suitably timed relationship with the moment at which the input speed of the automatic transmission has reached the synchronizing speed, and more specifically, a control apparatus which permits adequate engagement of the frictional coupling device, so as to prevent deterioration of its durability and minimize unexpected deterioration of the vehicle drivability, when the accelerator pedal is operated in the process of the upshift, and which is effective to prevent unexpected deceleration of the vehicle due to an engine braking effect when the accelerator pedal is subsequently released.

The above object may be achieved according to a first aspect of the present invention, which provides an apparatus for controlling a power transmitting system of an automotive vehicle, the power transmitting system including (a) an automatic transmission which is shifted up from a presently established lower-gear position to a higher-gear position having a lower speed ratio than the lower-gear position, by an engaging action of a frictional coupling device which is operated by a hydraulic cylinder, and (b) a hydraulic control device for supplying a pressurized fluid to the hydraulic cylinder to effect the engaging action of the frictional coupling device, the apparatus comprising: (a) synchronizing time estimating means for estimating a synchronizing time required for an input speed of the automatic transmission to reach a synchronizing speed of the higher-gear position, in the process of an upshift of the automatic transmission during running of the vehicle in a power-off state in which a vehicle drive force is not transmitted to drive wheels of the vehicle through the automatic transmission; (b) a time data memory storing a predetermined stroking time required for a piston of the hydraulic cylinder to reach an engaging stroke end; and (c) timing determining means operable in response to a command to effect said upshift during running of the vehicle in said power-off state, for comparing the synchronizing time with the predetermined stroking time, and thereby determining a point of time at which a supply of the pressurized fluid to the hydraulic cylinder is initiated.

The term "power-off state" of the vehicle is interpreted to mean a state in which the vehicle drive force is not transmitted from a vehicle drive power source such as an engine to the vehicle drive wheels through the automatic transmission. This "power-off state" includes not only a state in which the operator's required output of the drive power source is zero, namely, a state in which the accelerator pedal or other accelerating member for accelerating the vehicle is in the non-operated position, but also a state in which the vehicle drive force is not transmitted to the drive wheels because the operating amount of the accelerating member is smaller with respect to the running speed of the vehicle.

In the vehicle transmission control apparatus according to the first aspect of the present invention constructed as described above, the synchronizing time estimating means estimates the synchronizing time required for the input speed of the automatic transmission to reach the synchronizing speed of the higher-gear position to which the automatic transmission is shifted up, and the timing determining means compares the estimated synchronizing time with the predetermined stroking time stored in the time data memory, and thereby determines the point of time at which the supply of the pressurized fluid to the hydraulic cylinder is initiated. This control arrangement permits the frictional coupling device to be engaged in a suitably timed relationship with the point of time at which the input speed of the automatic transmission has substantially reached the synchronizing speed, irrespective of a variation in the rate of change of the input speed due to a variation in the operating characteristics of the engine. Thus, the present control apparatus is effective to minimize: an unexpected acceleration of the vehicle in the process of the upshift of the automatic transmission in the power-off state of the vehicle, which unexpected acceleration would occur if the generation of the engaging force of the frictional coupling device is initiated before the input speed has reached the synchronizing speed; and an expected deceleration of the vehicle which would occur if the generation of the engaging force is initiated after the input speed has reached the synchronizing speed.

The automatic transmission to which the control apparatus of the present invention is applicable may include a plurality of planetary gear sets, and a plurality of hydraulically operated frictional coupling devices such as clutches and brakes for connecting rotary elements of the planetary gear sets to each other or fixing those rotary elements to the housing of the automatic transmission. In this case, a selected on of a plurality of operating positions of the automatic transmission which have respective different speed ratios is established by engaging and releasing actions of the appropriate frictional coupling devices. The automatic transmission may be automatically shifted up in response to a shifting command which is generated on the basis of the vehicle running speed and the operating amount of the accelerator pedal or accelerating member. Alternatively, the automatic transmission is commanded to effect an upshift in response to an operation of a shift lever or switch by the vehicle operator. The automatic transmission equipped with the present transmission control apparatus may use a drive power source selected from among various drive power sources presently available, such as an engine operated by combustion of a fuel, and an electric motor operated with an electric energy.

The timing determining means operable in the power-off state may be operated only when the upshift of the automatic transmission is effected while the accelerating member is in the non-operated position. However, the timing determining means may be operated when the upshift is effected while the accelerating member is in an operated position, as long as the power-off state (in which a vehicle drive force is not transmitted from the vehicle drive power source to the vehicle drive wheels through the automatic transmission) is detected, for example, on the basis of the rotating speeds of the input and output members of a torque converter connected to the automatic transmission. The upshift may be a so-called "clutch-to-clutch shifting action" of the automatic transmission in which the frictional coupling device indicated above is engaged to establish the higher-gear position while at the same time another frictional coupling device which has been engaged to establish the lower-gear position is released. Alternatively, the upshift may be effected by controlling the engaging action of only the frictional coupling device which is engaged to establish the higher-gear position. In this case, the automatic transmission uses a one-way clutch to establish the higher-gear position, without the clutch-to-clutch shifting action.

In one preferred form of the first aspect of this invention, the synchronizing time estimating means detects a rate of change of the input speed, obtains the synchronizing speed on the basis of a speed ratio of the higher-gear position and an output speed of the automatic transmission, and calculates the synchronizing time by dividing a difference between the obtained synchronizing speed and the input speed by the rate of change of the input speed.

The output speed of the automatic transmission, which represents the vehicle running speed, may be considered substantially constant. However, the synchronizing speed may be estimated with higher accuracy, if the output speed and a rate of change of the output speed are used in addition to the input speed and the rate of change of the input speed.

The stroking time required for the piston of the hydraulic cylinder to reach the engaging stroke end differs depending upon the hydraulic pressure in the hydraulic control device. Usually, this hydraulic pressure is adjusted according to the output of the vehicle drive power source, for instance, the opening angle of the throttle valve of the engine. In this respect, it is preferred that the stroking time be determined or adjusted depending upon the output of the vehicle drive power source (e.g., opening angle of the throttle valve). The stroking time may be determined on the basis of other parameters such as the temperature of the working fluid, which influences the stroking time. To eliminate a difference in the characteristic between the individual hydraulic cylinders used in different vehicles to effect the upshift in question, the stroking time may be determined by actually detecting the time required for the piston to reach the engaging stroke end. In this case, the stroking time stored in the time data memory is updated by learning compensation based on the detected time.

The timing determining means is basically arranged to initiate the supply of the pressurized fluid to the hydraulic cylinder of the frictional coupling device, when the synchronizing time has become substantially equal to the stroking time. To prevent a shifting shock in the process of the upshift in the power-off state, the point of time at which the supply is initiated may be purposely delayed so that the generation of the engaging force of the frictional coupling device is initiated only after the input speed has reached the synchronizing speed. Further, to prevent an unexpected deceleration of the vehicle in the process of the upshift, the point of time at which the supply is initiated may be purposely advanced so that the generation of the engaging force is initiated before the input speed has reached the synchronizing speed.

The object indicated above may also be achieved according to a second aspect of this invention, which provides an apparatus for controlling a power transmitting system of an automotive vehicle, the power transmitting system including (a) an automatic transmission which is shifted up from a presently established lower-gear position to a higher-gear position having a lower speed ratio than the lower-gear position, by an engaging action of a frictional coupling device which is operated by a hydraulic cylinder, and (b) a hydraulic control device for supplying a pressurized fluid to the hydraulic cylinder to effect the engaging action of the frictional coupling device, the apparatus comprising: input torque limiting means operable in response to an increase in an amount of operation of an accelerating member for accelerating the vehicle, in the process of an upshift of the automatic transmission during running of the vehicle in a power-off state in which a vehicle drive force is not transmitted to drive wheels of the vehicle through the automatic transmission, the input torque limiting means limiting an input torque of the automatic transmission for a predetermined torque limiting time necessary to permit the frictional coupling device to have a torque capacity sufficient to prevent deterioration of its durability; and hydraulic pressure compensating means operable when the input torque is limited by the input torque limiting means, for increasing a line pressure of the hydraulic control device to increase a rate at which the pressurized fluid is supplied to the hydraulic cylinder.

The vehicle transmission control apparatus according to the second aspect of the invention is constructed to prevent deterioration of the durability of the friction members of the frictional coupling device, owing to an operation of the input torque limiting means to limit the input torque of the automatic transmission for a predetermined torque limiting time necessary for the frictional coupling device to have the torque capacity sufficient to prevent deterioration of its durability, when the accelerating member is operated, in the process of the upshift of the automatic transmission during running of the vehicle in the power-off state. The present apparatus is effective to minimize a shortage in the vehicle drive force upon operation of the accelerating member, while preventing the deterioration of durability of the friction members of the frictional coupling device with a minimum torque limiting time. Further, the line pressure of the hydraulic control device is temporarily raised during the input torque limiting control so that the pressurized fluid can be rapidly supplied to the hydraulic cylinder, to permit the frictional coupling device to be rapidly engaged to have the suitable torque capacity. Accordingly, the input torque limiting time can be further shortened, and the shortage of the vehicle drive force is effectively ameliorated.

The input torque limiting means and the hydraulic pressure compensating means operable in the power-off state may be operated only when the upshift of the automatic transmission is effected while the accelerating member is in the non-operated position. However, the input torque limiting means and the hydraulic pressure compensating means may be operated when the upshift is effected while the accelerating member is in an operated position, as long as the power-off state is detected, for example, on the basis of the rotating speeds of the input and output members of a torque converter connected to the automatic transmission. The upshift may be a so-called "clutch-to-clutch shifting action" of the automatic transmission in which the frictional coupling device indicated above is engaged to establish the higher-gear position while at the same time another frictional coupling device which has been engaged to establish the lower-gear position is released. Alternatively, the upshift may be effected by controlling the engaging action of only the frictional coupling device which is engaged to establish the higher-gear position. In this case, the automatic transmission uses a one-way clutch to establish the higher-gear position, without the clutch-to-clutch shifting action.

In one preferred form of the second aspect of the invention, the torque limiting time during which the input torque is limited by the input torque limiting means even after the increase in the amount of operation of the accelerating member is determined on the basis of a time lapse after a point of time at which the supply of the pressurized fluid to the hydraulic cylinder by the pressure control device is initiated to effect the upshift.

In one advantageous arrangement of the above preferred form, the torque limiting time is determined according to a predetermined relationship between the torque limiting time and the time lapse between the point of time at which the supply is initiated and a point of time at which the amount of operation of the accelerating member is increased, such that the torque limiting time decreases with an increase in the time lapse.

The torque capacity of the frictional coupling device which does not deteriorate the durability of the frictional coupling device does not necessarily mean full or complete engagement of the frictional coupling device. The torque limiting time may be a length of time necessary for the piston of the hydraulic cylinder to reach the engaging stroke end to initiate the generation of the engaging force or torque by the frictional coupling device. Further, the input torque of the automatic transmission may be limited until the detected or estimated pressure in the hydraulic cylinder has been raised to a predetermined level which permits the frictional coupling device to have a torque capacity sufficiently large to prevent deterioration of its durability.

Where the output of the vehicle drive power source is electrically controlled according to a change in the operating amount of the accelerating member, the input torque limiting means may be adapted to prevent or limit an increase of the output of the vehicle drive power source. Where the vehicle drive power source is mechanically connected directly to the accelerating member, the input torque limiting means may be adapted to release or partially engage an input clutch between the automatic transmission and the drive power source, in order to limit the input torque of the automatic transmission. Where the vehicle drive power source is an engine, the input torque of the automatic transmission may be limited by controlling the ignition timing of the engine or the amount of fuel injection into the engine.

Where the hydraulic control device is arranged such that the line pressure is increased with an increase in the output of the vehicle drive power source (increase in the opening angle of a throttle valve), the line pressure would not be raised when the output of the drive power source is not increased with an increase in the amount of operation of the accelerating member. In the presence of the hydraulic pressure compensating means according to the second aspect of this invention, the line pressure can be temporarily increased according to an increase in the amount of operation of the accelerating member. For instance, the line pressure is temporarily raised to a level determined on the basis of a compensated operating amount of the accelerating member, which is obtained by multiplying the actual operating amount of the accelerating member with a suitable compensating coefficient (larger than 1).

The object indicated above may also be achieved according to a third aspect of the present invention, which provides an apparatus for controlling a power transmitting system of an automotive vehicle, the power transmitting system including (a) an automatic transmission which is shifted up from a presently established lower-gear position to a higher-gear position having a lower speed ratio than the lower-gear position, by an engaging action of a frictional coupling device which is operated by a hydraulic cylinder, and (b) a hydraulic control device including a pressure regulating device for supplying a pressurized fluid to the hydraulic cylinder to effect the engaging action of the frictional coupling device, and for controlling a pressure of the pressurized fluid to be supplied to the hydraulic cylinder, the apparatus comprising engaging and releasing control means operable in the process of an upshift of the automatic transmission, for controlling the pressure regulating device such that the pressurized fluid is supplied to the hydraulic cylinder to effect the engaging action of the frictional coupling device while an accelerating member for accelerating the vehicle is in operation, and such that a piston of the hydraulic cylinder is held at a standby position close to an engaging stroke end thereof, while the accelerating member is not in operation, the frictional coupling device being placed in a released state thereof when the piston is held at the standby position.

The accelerating member, which may be an accelerator pedal, is operated by the vehicle operator when the vehicle operator wants to accelerate the vehicle, and is held in its non-operated position when the vehicle operator does not want to accelerate the vehicle.

In the vehicle transmission control apparatus constructed according to the third aspect of the invention described above, the pressure regulating device is controlled to supply the pressurized fluid to the hydraulic cylinder to effect the engaging action of the frictional coupling device while the accelerating member is placed in an operated position, and hold the piston of the hydraulic cylinder at its standby position close to the engaging stroke end, for holding the frictional coupling device in its released state, while the accelerating member is placed in its non-operated position. This arrangement prevents the application of an engine brake to the vehicle and consequent unexpected deceleration of the vehicle, even in the absence of a one-way clutch to effect the upshift. Further, the piston of the hydraulic cylinder is held at the standby position close to the engaging stroke end, the frictional coupling device can be engaged to establish the higher-gear position in a relatively short time after a subsequent operation of the accelerating member, so that the vehicle drive force can be produced shortly after the accelerating member is operated. Thus, the engaging and releasing control means provided according to this third aspect of the invention provides substantially the same effect as achieved by the one-way clutch.

BRIEF DESCRIPTION OF THE DRAWINGS

The above and other objects, features, advantages and technical and industrial significance of the present invention will be better understood and appreciated by reading the following detailed description of a presently preferred embodiment of the invention, when considered in connection with the accompanying drawings, in which:

FIG. 2 is a view indicating a relationship between a plurality of operating positions of an automatic transmission of the power transmitting system of FIG. 1, and combinations of operating states of hydraulically operated frictional coupling devices provided to establish the operating positions;

DETAILED DESCRIPTION OF THE PREFERRED EMBODIMENTS

Figure 1:
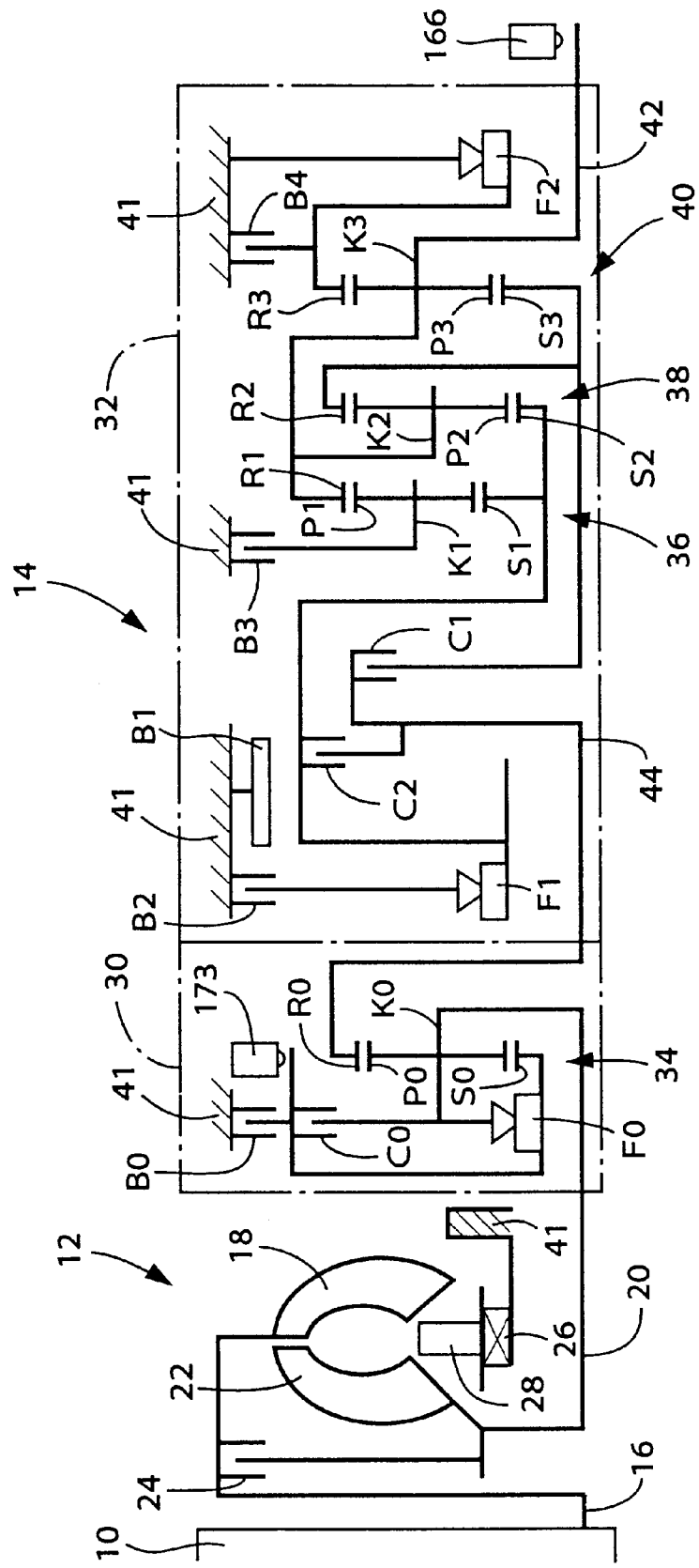
FIG. 1 is a schematic view illustrating a power transmitting system of an automotive vehicle to which the present invention is applied.

Referring first to the schematic view of FIG. 1, there is shown a power transmitting system of an automotive vehicle to which the present invention is applied. This power transmitting system includes a torque converter 12 and an automatic transmission 14 which are operatively connected to an output of a drive power source in the form of an engine 10. The engine 10 may be an internal combustion engine of an air-fuel mixture supply type or a fuel injection type. The engine 10 may be replaced by other types of drive power source such as an external combustion engine. The output of the engine 10 is transmitted to drive wheels of the vehicle through the torque converter 12, automatic transmission 10, and a differential gear and an drive axle which are well known in the art.

The torque converter 12 includes a pump impeller 18 connected to a crankshaft 16 of the engine 10, a turbine impeller 22 connected to an input shaft 20 of the automatic transmission 14, a lock-up clutch 24 which is engaged for direct connection of the pump and turbine impellers 18, 22, and a stator 28 which is prevented by a one-way clutch 26 from rotating in one direction.

The automatic transmission 14 includes a first transmission unit 30 having a high-gear position and a low-gear position, and a second transmission unit 32 having a rear-drive position and four forward-drive positions. The first transmission unit 30 includes a High-Low planetary gear set 34 having a sun gear S0, a ring gear R0, a carrier K0, and a planetary gear P0 which is rotatably supported by the carrier K0 and which meshes with the sun gear S0 and the ring gear R0. The first transmission unit 30 further includes a clutch C0 and a one-way clutch F0 which are disposed between the sun gear S0 and the carrier K0, and a brake B0 disposed between the sun gear S0 and a housing 41 of the automatic transmission 14.

The second transmission 32 includes a first planetary gear set 36, a second planetary gear set 38 and a third planetary gear set 40. The first planetary gear set 36 has a sun gear S1, a ring gear R1, a carrier K1, and a planetary gear P1 which is rotatably supported by the carrier K1 and which meshes with the sun gear S1 and the ring gear R1. The second planetary gear set 38 has a sun gear S2, a ring gear R2, a carrier K2, and a planetary gear P2 which is rotatably supported by the carrier K2 and which meshes with the sun gear S2 and the ring gear R2. The third planetary gear set 40 has a sun gear S3, a ring gear R3, a carrier K3, and a planetary gear P3 which is rotatably supported by the carrier K3 and which meshes with the sun gear S3 and the ring gear R3.

The sun gears S1 and S2 are formed integrally with each other, and the ring gear R1 and the carriers K2 and K3 are formed integrally with each other. The carrier K3 is connected to an output shaft 42 of the automatic transmission. The ring gear R2 is integrally connected to the sun gear S3. A clutch C1 is disposed between an intermediate shaft 44 and the ring and sun gears R2 and S3, while a clutch C2 is disposed between the intermediate shaft 44 and the sun gears S1 and S2. A band brake B1 for inhibiting rotation of the sun gears S1, S2 is disposed on the housing 41. A series connection of a one-way clutch F1 and a brake B2 is disposed between the housing 41 and the sun gears S1, S2. This one-way clutch F1 is adapted to be engaged when a torque acts on the sun gears S1, S2 in the direction opposite to the direction of rotation of the input shaft 20.

A brake B3 is disposed between the carrier K1 and the housing 41, and a parallel connection of a brake B4 and a one-way clutch F2 is disposed between the ring gear R3 and the housing 41. This one-way clutch F2 is adapted to be engaged when a torque acts on the ring gear R3 in the reverse direction.

Figure 5:
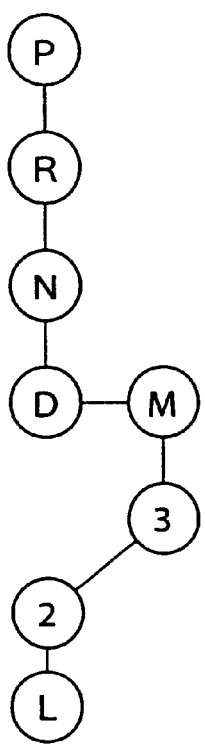
FIG. 5 is a view indicating an arrangement of operating positions of a transmission shift lever shown in FIG. 3.

The automatic transmission 14 which is constructed as described above has one rear-drive position "Rev", and five forward-drive positions, namely, a first-speed position "1st", a second-speed position "2nd", a third-speed position "3rd", a fourth-speed position "4th" and a fifth-speed position "5th", as indicated in FIG. 2. The five forward-drive positions have respective different speed ratios. In FIG. 2, white circles indicate the engaged states of the clutches C0–C2, brakes B0–B4 and one-way clutches F0–F2, and blanks indicate the released states, while black circles indicate the engaged states which are established when an engine brake is applied to the vehicle with a shift lever 172 (FIG. 3) placed in any one of engine braking positions. As shown in FIG. 5, the shift lever 172 has a PARKING position "P", a REVERSE position "R", a NEUTRAL position "N", a DRIVE position "D", a MANUAL position "M", a THIRD position "3", a SECOND position "2" and a LOW position "L". Of these positions, the MANUAL position "M", THIRD position "3", SECOND position "2" and LOW position "L" are the engine braking positions. Namely, when the shift lever 172 is placed in any one of these engine braking positions "M", "3", "2" and "L", an engine brake is applicable to the vehicle with the automatic transmission 14 placed in the highest one of the forward-drive positions which can be established in the selected engine braking position of the shift lever 162.

When the shift lever 172 is placed in the LOW position "L" in which the automatic transmission 14 can be placed in only the first-speed position "1st", an engine brake is applied to the vehicle with the brake B4 placed in the engaged state, if the vehicle is coasting in a POWER-OFF state with an accelerator pedal 150 held in the non-operated position. On the other hand, when the vehicle is coasting in the POWER-OFF state with the accelerator pedal 150 held in the non-operated position while the automatic transmission 14 is placed in the first-speed position "1st" with the shift lever 172 placed in the DRIVE position "D", an engine brake is not applied to the coasting vehicle, since the one-way clutch F2 is permitted to slip and the ring gear R3 is permitted to rotate under non load, disabling the automatic transmission 14 to transmit a torque from the drive wheels to the engine 10. When the shift lever 172 is placed in the SECOND position "2" in which the automatic transmission 14 can be placed in one of the first-speed and second-speed positions "1st", "2nd", an engine brake is applicable to the vehicle with the clutch C0 placed in the engaged state during coasting of the vehicle with the automatic transmission 14 placed in the second-speed position "2nd". When the vehicle is coasting while the automatic transmission 14 is placed in the second-speed position "2nd" with the shift-lever 172 placed in the DRIVE position "D", no engine brake is applicable to the coasting vehicle since the clutch C0 is released to permit the one-way clutch F0 to slip. When the vehicle is coasting while the automatic transmission 14 is placed in the third-speed position "3rd" with the shift lever 172 placed in the THIRD position "3" in which the automatic transmission 14 can be placed in one of the first-speed, second-speed and third-speed positions "1st", "2nd" and "3rd", an engine brake is applicable to the vehicle with the brake B1 placed in the engaged state. When the vehicle is coasting while the automatic transmission 14 is placed in the third-speed position "3rd" with the shift lever 172 placed in the DRIVE position "D", no engine brake is applicable to the coasting vehicle, since the brake B1 is released to permit the one-way clutch F1 to slip.

The shift lever 172 is supported by a suitable support mechanism such that the PARKING, REVERSE, NEUTRAL, DRIVE, MANUAL, THIRD, SECOND and LOW positions "P", "R", "N", "D", "N", "M", "3", "2" and L" are selected by moving the shift lever 172 in the running or longitudinal direction of the vehicle, while the DRIVE and MANUAL positions "D" and "M" are selected by moving the shift lever 172 in the lateral or transverse direction of the vehicle, as indicated in FIG. 5. This shift lever 172 is mechanically connected to a manual vale (not shown) incorporated in a hydraulic control device 184 shown in FIG. 3.

Figure 6:
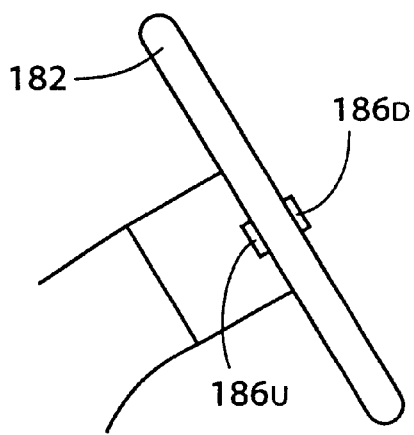
FIG. 6 is a side elevational view of a steering wheel equipped with an upshift switch and a downshift switch.

The vehicle has a steering wheel 182 which carries on its upper rear surface a downshift switch 186D and on its lower front surface an upshift switch 186U, as shown in FIG. 6. These downshift and upshift switches 186D and 186U are operable while the shift lever 172 is placed in the MANUAL position "M". The automatic transmission 14 is manually shifted down each time the downshift switch 186D is pressed downwards, and is manually shifted up each time the upshift switch 186U is pressed upwards.

The clutches C0–C2 and brakes B0–B4 described above are hydraulically operated frictional coupling devices of multiple disc type, single disc type or band type, whose friction members are operated to engage each other by hydraulic cylinders which are activated by a pressurized working fluid. The hydraulic cylinders of the frictional coupling devices are engaged and released under the control of the hydraulic control device 184 shown in FIG. 3.

Figure 4:
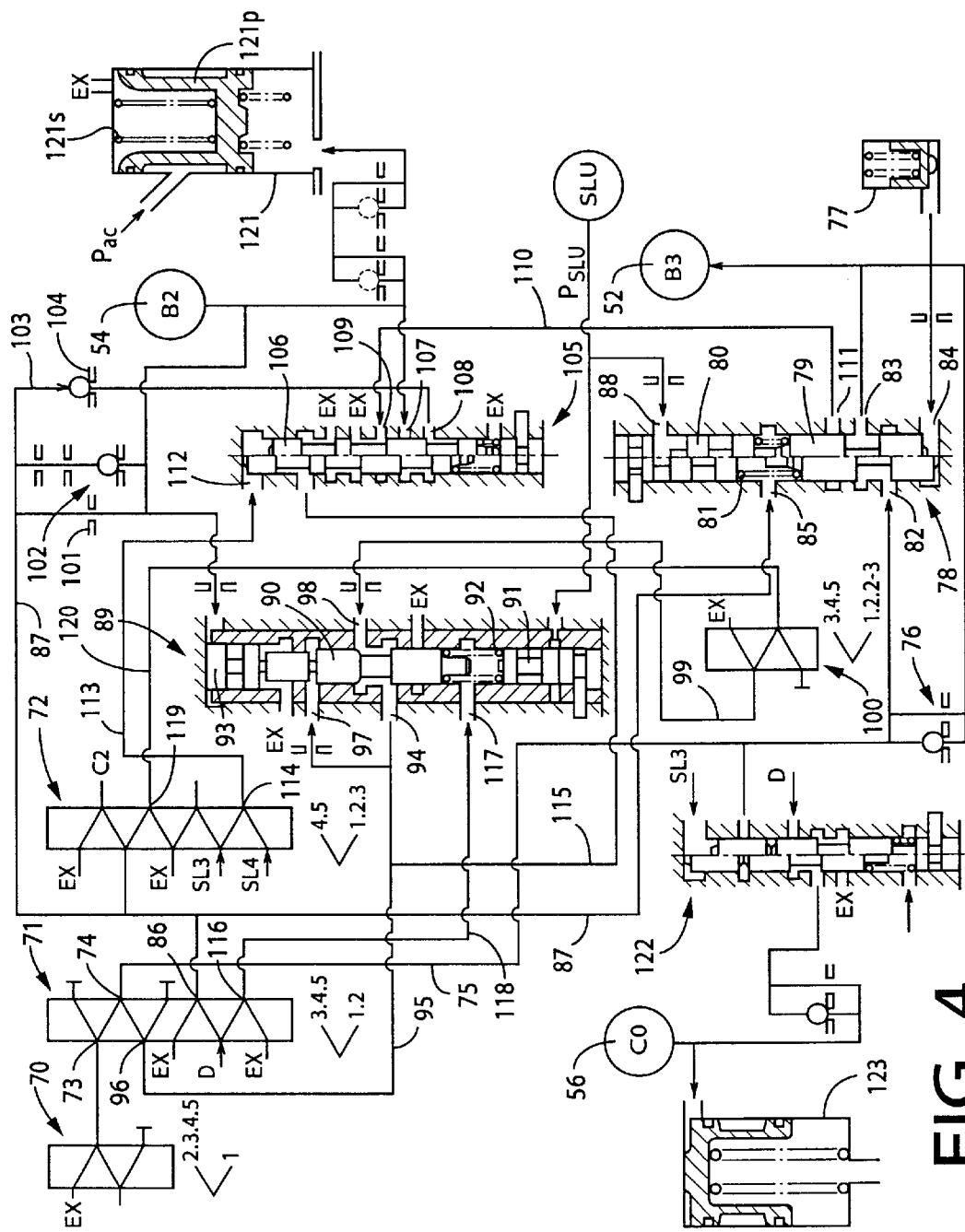
FIG. 4 is a diagram showing a part of a hydraulic control device shown in FIG. 3.

The hydraulic control device 184, the hydraulic circuity of which is shown in FIG. 4, includes a 1-2 shift valve 70, a 2-3 shift valve 71, and a 3-4 shift valve 72. Below the rectangular blocks representing these shift valves 70, 71, 72 in FIG. 4, there are given numerals indicating the forward-drive positions of the automatic transmission 14 which are established when the shift valves 70, 71, 72 are placed in the different operating positions for selective communication of their ports.

Figure 3:
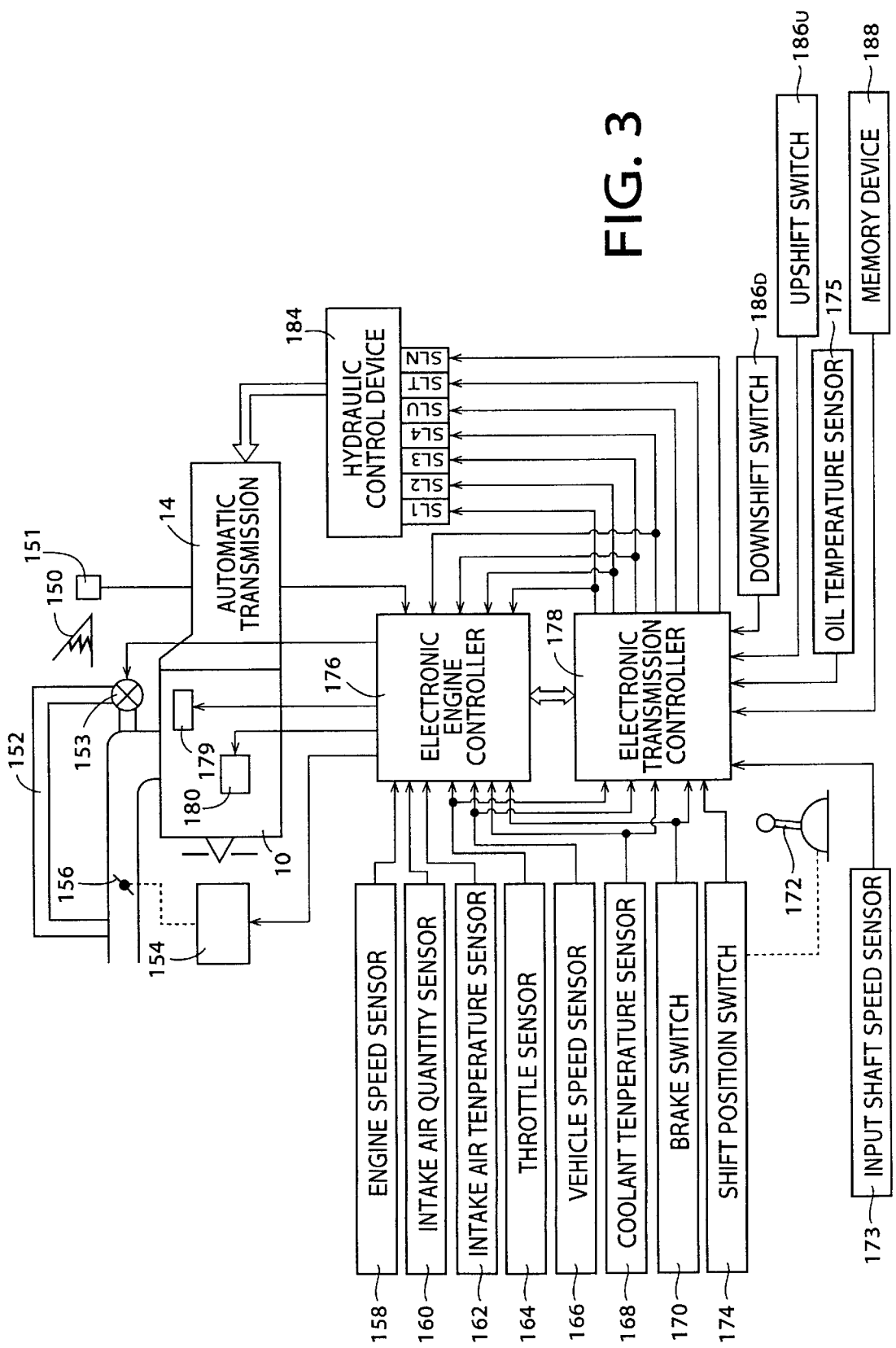
FIG. 3 is a block diagram showing an electric control system for controlling an engine of the vehicle and the automatic transmission of FIG. 1.

The 2-3 shift valve 71 includes an input port 73, and a brake port 74 which communicates with the input port 73 for establishing the first-speed and second-speed positions "1st", "2nd". To the brake port 74, there is connected through an oil passage 75 a hydraulic cylinder 52 of the brake B3. The oil passage 75 is provided with an orifice 76. To a portion of the oil passage 75 between the orifice 76 and the brake B3, there is connected a damper valve 77 which achieves a damping action to receive a relatively small amount of the pressurized fluid when the brake B3 is abruptly supplied with the pressurized fluid having a line pressure PL. The line pressure PL is controlled by a linear solenoid valve SLT (FIG. 3), according to a presently regired output of the engine 10 as represented by an opening angle $\theta_{TH}$ of a throttle valve 156 (FIG. 3).

Reference numeral 78 denotes a B3 control valve for directly controlling an engaging hydraulic pressure $P_{B3}$ of the brake B3. The B3 control valve 78 has: a spool 79; a plunger 80; a spring 81 interposed between the spool 79 and the plunger 80; an input port 82 which is selectively closed and opened by the spool 79; an oil passage 75 connected to the input port 82; and an output port 83 which is selectively brought into communication with the input port 82 and which is connected to the brake B3. The B3 control valve 78 further has a feedback port 84 partially defined by one end of the spool 79 remote from the plunger 80, and a port 85 which is open in a space in which the spring 81 is disposed. The port 85 is connected through an oil passage 87 to a port 86 of the 2-3 shift valve 71, from which a DRIVE position pressure (line pressure PL) is delivered when one of the third-speed, fourth-speed and fifth-speed positions "3rd", "4th" and "5th" is established. The B3 control valve 78 further has a control port 88 which is partially defined by one end of the plunger 80 remote from the spool 79. To this control port 88, there is connected a linear solenoid valve SLU (FIG. 3), so that the control port 88 receives a SLU pressure $P_{SLU}$ from the linear solenoid valve SLU. The B3 control valve 78 is constructed such that the output pressure delivered from the output port 83 is controlled on the basis of the biasing force of the spring 81 and the pressure applied to the port 85, and such that the biasing force of the spring 81 increases with an increase in the SLU pressure $P_{SLU}$ applied to the control port 88.

Reference numeral 89 in FIG. 4 denotes a 2-3 timing valve which has: a spool 90 having a small-diameter land and two large-diameter lands; a first plunger 91; a spring 92 interposed between the spool 90 and the first plunger 91; and a second plunger 92 disposed on one side of the spool 91 remote from the first plunger 91. The 2-3 timing valve 89 further has a port 94 formed at an intermediate portion thereof and connected to an oil passage 95 which is connected to a port 96 of the 2-3 shift valve 71 which is brought into communication with the brake port 74 when one of the third-speed, fourth-speed and fifth-speed positions "1st", "2nd" and "3rd" is established. The oil passage 95 is further connected through an orifice to a port 97 which is open between the small-diameter land and one of the two large-diameter lands indicated above. The 2-3 timing valve 89 further has a port 98 which is selectively brought into communication with the above-indicated port 94 and which is connected through an oil passage 99 to a solenoid relay valve 100. The linear solenoid valve SLU is connected a chamber which is partially defined by one end of the first plunger 91 remote from the spool 90, while a hydraulic cylinder 54 of the brake B2 is connected through an orifice to a chamber which is partially defined by one end of the second plunger 93 remote from the spool 90.

The oil passage 87 indicated above is also connected to the brake B2, and is provided with a small-diameter orifice 101 and an orifice 102 having a check ball. To the oil passage 86 is connected an oil passage 103 provided with a large-diameter orifice 104 having a check ball which is opened when the pressurized fluid is discharged from the brake B2. The oil passage 103 is connected to an orifice control valve 105 which will be described.

The orifice control valve 105 is provided to control the rate at which the pressurized fluid is discharged from the brake B2. The orifice control valve 105 includes a spool 106, and has a port 107 formed in an intermediate portion thereof so as to be opened and closed by the spool 106. The port 107 is connected to the brake B2. The orifice control valve 105 further has a port 108 formed below the port 107 as seen in FIG. 4. The port 108 is connected to the above-indicated oil passage 103. The valve 105 further has a port 109 formed above the port 107 connected to the brake B2. The port 108, which is selectively brought into communication with a drain port, is connected through an oil passage 110 to a port 111 of the above-indicated B3 control valve 78. The port 111 is selectively brought into communication with the output port 83 connected to the brake B3.

The orifice control valve 105 further has a control port 112 which is partially defined by one end of the spool 106 remote from the spring biasing the spool 106. The control port 112 is connected through an oil passage 113 to a port 114 of the 3-4 shift valve 72. The port 114 delivers a SL3 pressure of a third solenoid-operated valve SL3 (FIG. 3) when one of the third-speed, second-speed and first-speed positions "3rd", "2nd" and "1st" is established, and a SL4 pressure of a fourth solenoid-operated valve SL4 (FIG. 3) when one of the fourth-speed and fifth-speed positions "4th", "5th" is established. The above-indicated oil passage 95 is connected to an oil passage 115, which in turn is connected to the orifice control valve 105. The oil passage 115 is selectively brought into communication with a drain port of the valve 105.

The 2-3 shift valve 71 further has a port 116 from which the DRIVE pressure is delivered when the first-speed or second-speed position "1st", "2nd" is established. The port 116 is connected through an oil passage 118 to a port 117 of the 2-3 timing valve 89, which port 117 is open in a space in which the spring 92 is disposed. The 3-4 shift valve 72 has a port 119 which is brought into communication with the oil passage 86 when one of the first-, second- and third-speed positions "1st", "2nd", "3rd" is established. The port 119 is connected through an oil passage 120 to the solenoid relay valve 100.

Reference numeral 121 in FIG. 4 denotes a B2 accumulator for the brake B2. The B2 accumulator 121 has a back-pressure chamber which receives an accumulator control pressure $P_{ac}$ which has been regulated according to a SLN pressure $P_{SLN}$ of a linear solenoid valve SLN (FIG. 3). When the 2-3 shift valve 71 is switched when the automatic transmission 14 is shifted up from the second-speed position "2nd" to the third-speed position "3rd", the DRIVE pressure (line pressure PL) is applied through the oil passage 87 to the hydraulic cylinder 54 of the brake B2. With this line pressure PL, an upward movement of a piston 121p of the B2 accumulator 121 is initiated. As long as the piston 121p is moved upward, a pressure $P_{B2}$ applied to the brake B2 is held substantially constant at a level at which a force based on the pressure $P_{B2}$ is equal to a sum of a biasing force of a spring 121s biasing the piston 121p in the downward direction and a force based on the above-indicated accumulator control pressure $P_{ac}$ which also biases the piston 121p in the downward direction. Described more precisely, as the spring 121s is elastically compressed, the pressure $P_{B2}$ is gradually raised. When the piston 121p has reached its uppermost position, the pressure $P_{B2}$ has been raised to the line pressure PL. That is, the engaging pressure $P_{B2}$ of the brake B2 during the movement of the piston 121p is determined by the accumulator control pressure $P_{ac}$.

The accumulator control pressure $P_{ac}$ is applied to not only the accumulator 121 for the brake B2 which is engaged to establish the third-speed position "3rd", but also an accumulator for the clutch C1 which is engaged to establish the first-speed position "1st", an accumulator for the clutch C2 which is engaged to establish the fourth-speed position "4th", and an accumulator for the brake B0 which is engaged to establish the fifth-speed position "5th". Thus, the accumulator control pressure $P_{ac}$ is used to control the pressures of those brakes B2 and B0 and clutches C1 and C2 in the process of engaging action thereof.

Reference numeral 122 in FIG. 4 denotes a C0 exhaust valve, and reference numeral 123 denotes a C0 accumulator for the clutch C0. The C0 exhaust valve 122 is provided to apply a pressurized fluid to a hydraulic cylinder 56 of the clutch C0 for engaging the clutch C0, in order to apply an engine brake to the vehicle during coasting of the vehicle while the automatic transmission 14 is placed in the second-speed position "2nd" with the shift lever 172 placed in the SECOND position "2".

In the hydraulic control device 184 constructed as described above by reference to FIG. 4, it is possible to directly control the engaging hydraulic pressure $P_{B3}$ of the brake B3 by means of the B3 control valve 78 while the port 111 of the valve 78 is in communication with the drain port. The engaging pressure $P_{B3}$ can be regulated by the linear solenoid valve SLU. When the spool 106 of the orifice control valve 105 is in the position indicated at left in FIG. 4, the pressurized fluid can be discharged from the brake B2 through the orifice control valve 105, at a controllable rate.

When the automatic transmission 14 is shifted up from the second-speed position "2nd" to the third-speed position "3rd", the brake B3 is released while at the same time the brake B2 is engaged. This upshift is a so-called "clutch-to-clutch shifting action" of the automatic transmission 14. In this clutch-to-clutch shifting action, a shifting shock of the transmission 14 can be suitably reduced by controlling the hydraulic pressure of the brake B3 during its releasing action and the hydraulic pressure of the brake B2 during its engaging action, on the basis of the input torque of the input shaft 20 of the transmission 14. In other shifting actions of the automatic transmission 14, the hydraulic pressure of the clutch C1, C2 or brake B0 during the engaging or releasing action can be regulated by controlling the duty ratio of the linear solenoid valve SLN.

Referring to the block diagram of FIG. 3, an acceleration sensor 151 is provided to detect an operating amount $A_{CC}$ of the accelerator pedal 150. The accelerator pedal 150 functions as a vehicle accelerating member whose operating amount $A_{CC}$ is considered to represent the presently required output of the engine 10. Within an intake pipe of the engine 10 of the vehicle, there is disposed the above-indicated throttle valve 156 whose opening angle $\theta_{TH}$ is changed by a throttle actuator 154, depending upon the operating amount $A_{CC}$ of the accelerator pedal 150. A by-pass passage 152 is connected to the intake pipe, so as to by-pass the throttle valve 156. In the by-pass passage 152, there is disposed an idling speed control valve (ISC valve) 153 for controlling the quantity of intake air of the engine 10 when the throttle valve 156 is fully closed. The ISC valve 153 functions to control the idling speed of the engine 10.

The electric control system for the power transmitting system includes various sensors, detectors and switches such as: an engine speed sensor 158 for detecting a rotating speed $N_E$ of the engine 10; an intake air quantity sensor 160 for detecting an intake air quantity Q of the engine 10; an intake air temperature sensor 162 for detecting a temperature $T_A$ of the intake air; a throttle sensor 164 for detecting the opening angle $\theta_{TH}$ of the throttle valve 156, the throttle sensor 164 being equipped with an idling detector switch for detecting the idling state of the engine 10; a vehicle speed sensor 166 for detecting a rotating speed $N_{OUT}$ of the output shaft 42 of the automatic transmission 14, for thereby obtaining a running speed V of the vehicle; a coolant temperature sensor 168 for detecting a temperature $T_W$ of the coolant water of the engine 10; a brake switch 170 for detecting an operation of a brake pedal; a shift position sensor 174 for detecting a presently selected position $P_{SH}$ of the shift lever 172; an input shaft speed sensor 173 for detecting a rotating speed $N_{IN}$ of the input shaft 20 of the automatic transmission 14, namely, a rotating speed $N_{CO}$ of the clutch C0, which is equal to a rotating speed $N_T$ of the turbine impeller 22 of the torque converter 12; and an oil temperature sensor 175 for detecting a temperature $T_{OIL}$ of the working fluid in the hydraulic control device 184. The control system uses an electronic engine controller 176 and an electronic transmission controller 178, which receive output signals of the above-indicated sensors and switch indicative of the engine speed $N_E$, intake air quantity Q, intake air temperature $T_A$, throttle opening angle $\theta_{TH}$, vehicle speed V, coolant temperature $T_W$, braking operating condition BK, selected position $P_{SH}$ of the shift lever 172, input shaft speed $N_{IN}$ (turbine impeller speed $N_{CO}$), and oil temperature $T_{OIL}$.

Figure 7:
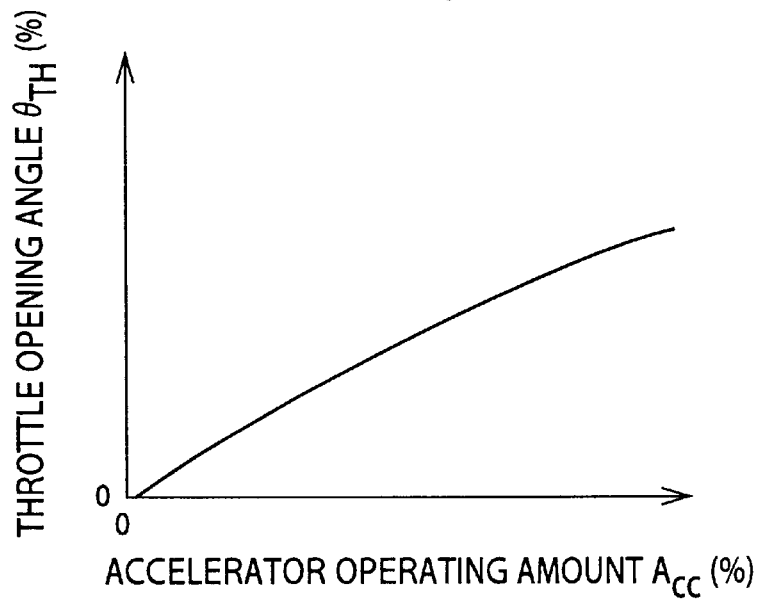
FIG. 7 is a graph indicating a characteristic of control of a throttle actuator shown in FIG. 3, more specifically, a relationship between the opening angle $\theta_{TH}$ of a throttle valve and an operating amount $A_{CC}$ of an accelerator pedal.

The engine controller 176 shown in FIG. 3 is constituted by a so-called microcomputer incorporating a central processing unit (CPU), a random-access memory (RAM), a read-only memory (ROM), and an input/output interface. The CPU operates to process the various input signals, according to control programs stored in the ROM while utilizing a temporary data storage function of the RAM. The engine controller 176 controls: a fuel injector valve 179 for controlling the amount of injection of a fuel into the engine 10; an ignitor 180 for controlling an ignition timing of the engine 10; the above-indicated ISC valve 153 for controlling the idling speed of the engine 10; the above-indicated throttle actuator 154 to control the throttle valve 156, for effecting a traction control well known in the art, that is, for controlling the drive forces applied to the vehicle drive wheels, so as to prevent excessive slipping of the drive wheels. For example, the engine controller 176 is arranged to control the actuator 154 on the basis of the operating amount $A_{CC}$ of the accelerator pedal 150, such that the opening angle $\theta_{TH}$ of the throttle valve 156 increases with an increase in the operating amount $A_{CC}$ of the accelerator pedal 150, according to a predetermined relationship between the operating amount $A_{CC}$ and the opening angle $\theta_{TH}$, as shown in FIG. 7. The engine controller 176 is connected to the transmission controller 178, so that each of these controllers 176, 178 may receive necessary signals from the other controller, through a transmitter and a receiver provided for each controller 176, 178.

Figure 8:
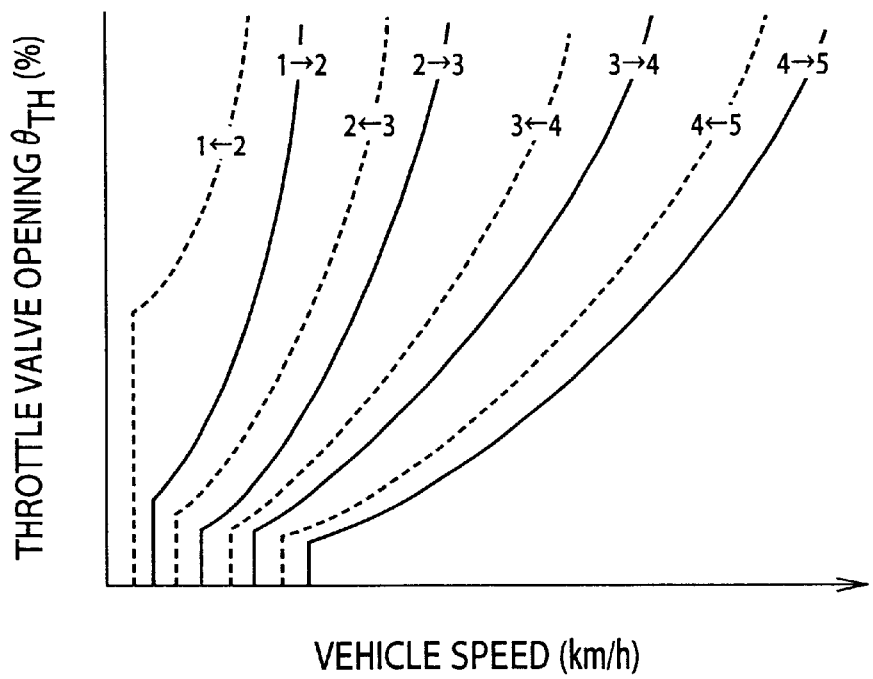
FIG. 8 is a graph indicating upshift and downshift boundary lines used by an electronic transmission controller shown in FIG. 3, for controlling shifting actions of the automatic transmission.

The transmission controller 178 is also constituted by a so-called microcomputer similar to that of the engine controller 176. The CPU of the transmission controller 178 operates to process the input signals according to control programs stored in the ROM while utilizing a temporary data storage function of the RAM, for controlling the solenoid-operated valves SL1, SL2, SL3, SL4, and the linear solenoid valves SLU, SLT, SLN. Described in detail, the transmission controller 178 selects an appropriate one of the five forward-drive positions "1" through "5" of the automatic transmission 14, on the basis of the detected throttle opening angle $\theta_{TH}$ and vehicle speed V, and according to upshift and downshift boundary lines whose data are stored in the ROM. Each upshift or downshift boundary line is a relationship between the vehicle speed V and the throttle opening angle $\theta_{TH}$, as shown in FIG. 8 wherein solid lines represent the upshift boundary lines while broken lines represent downshift boundary lines. The transmission controller 178 controls the solenoid-operated valves SL1–SL4 so as to shift the automatic transmission 14 to the selected forward-drive position.

Figure 9:
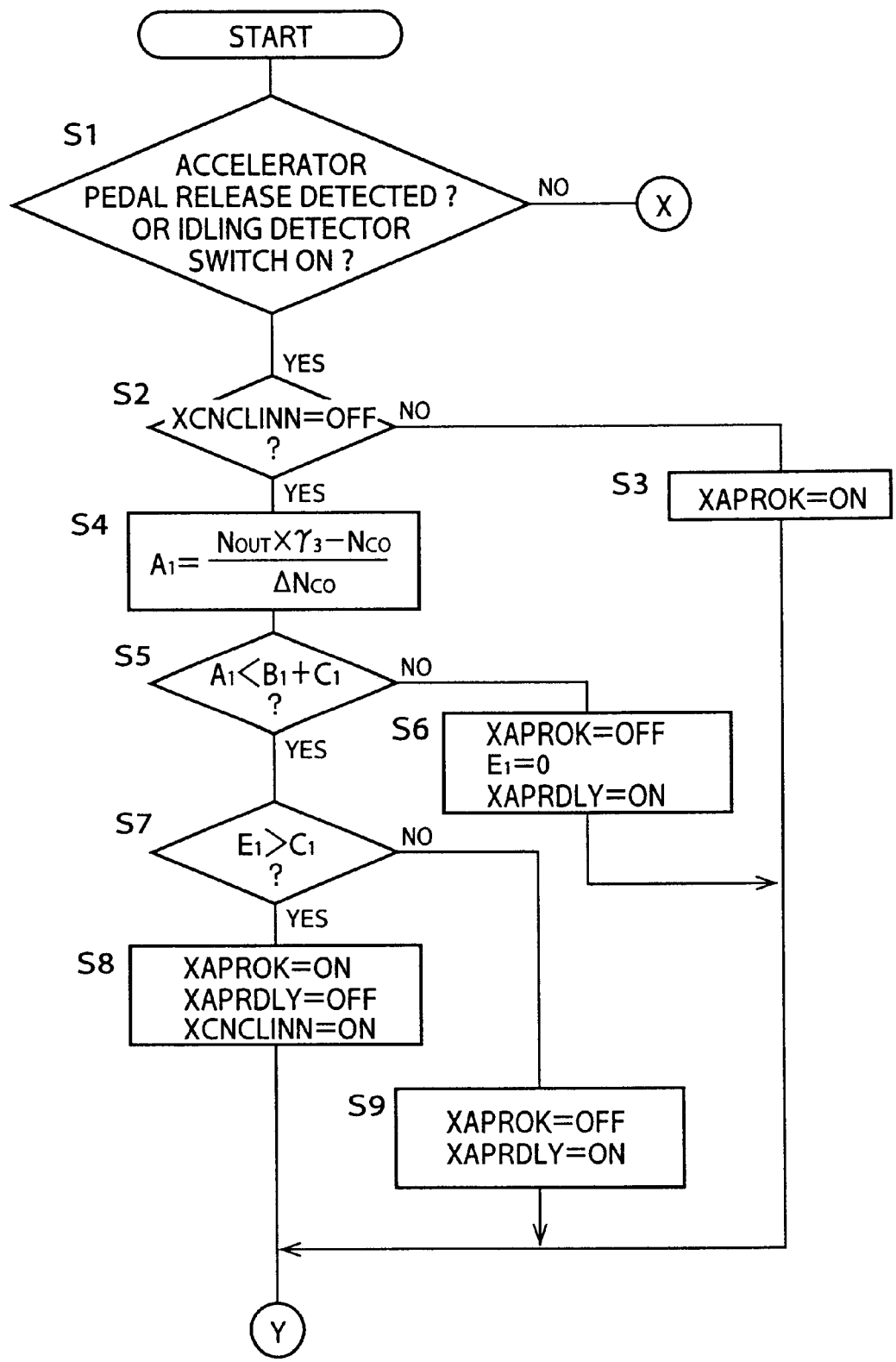
FIG. 9 is a flow chart illustrating a part of a routine executed by the transmission controller for controlling a 2-3 upshift of the automatic transmission.
Figure 10:
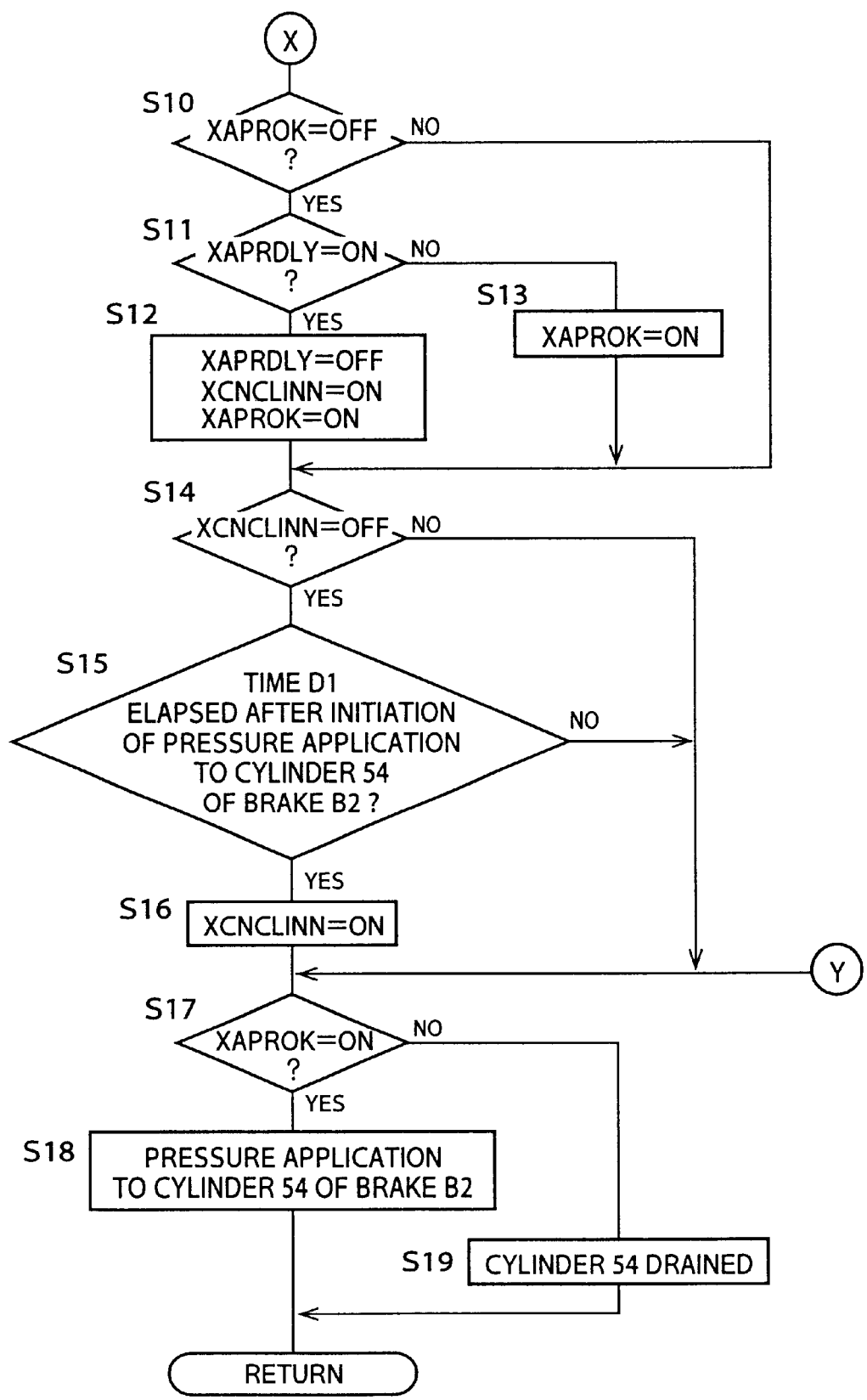
FIG. 10 is a flow chart illustrating the rest of the routine of FIG. 9.
Figure 11:
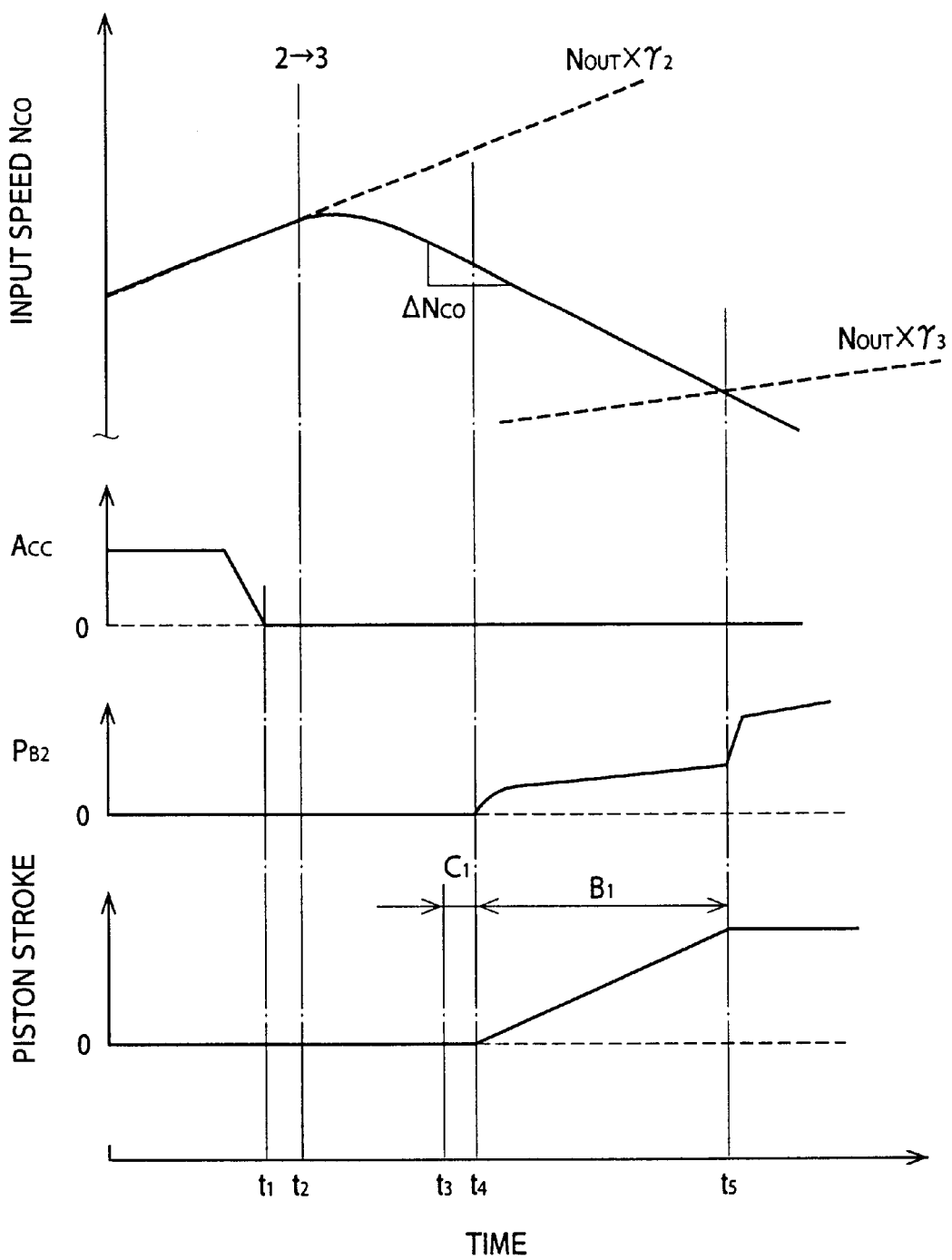
FIG. 11 is a time chart showing changes of various parameters, by way of example, when the 2-3 upshift is controlled according to the routine of FIGS. 9 and 10.

Referring to the flow charts of FIGS. 9 and 10, there will be described the routine executed by the electronic transmission controller 178 when a command to effect a 2-3 upshift of the automatic transmission 14 is generated. The routine is repeatedly executed with a predetermined cycle time. The time chart of FIG. 11 shows changes of various parameters when the 2-3 upshift is controlled according to the routine of FIGS. 9 and 10 while the operating amount $A_{CC}$ of the accelerator pedal 150 is zeroed. At a point of time t1 immediately after the operating amount $A_{CC}$ has been zeroed, the brake B3 which has been engaged to establish the second-speed position "2nd" is released by so controlling the linear solenoid control valve SLU. At a later point of time t2 at which the automatic transmission 14 is commanded to effect the 2-3 upshift, the routine of FIGS. 9 and 10 is initiated. However, the 2-3 shift valve 71 is not immediately switched, but the shift valve 71 is controlled in steps S18 and S19 indicated in FIG. 10. It will be understood that the brake B2 is a frictional coupling device operated by the hydraulic cylinder 54 which is controlled to effect an upshift of the automatic transmission 14 according to the principle of the present invention.

The routine of FIGS. 9 and 10 is initiated with step S1 to determine whether the accelerator pedal 150 which has been operated has been released released, or the idling detector switch of the throttle sensor 164 has been turned on. If the accelerator pedal 150 has been released or the idling detector switch has been turned on, an affirmative decision (YES) is obtained in step S1, and the control flow goes to step S2. If a negative decision (NO) is obtained in step S1, that is, if the vehicle is running in a POWER-ON state in which the accelerator pedal 150 is placed in an operated position, the control flow goes to step S10 of FIG. 10. Since the throttle valve 156 is normally controlled according to the operating amount $A_{CC}$ of the accelerator pedal 150, as shown in FIG. 7, a fact that the idling detector switch is on means that the vehicle is in a POWER-OFF state in which the accelerator pedal 150 is in the non-operated position.

Step S2, which is implemented when the 2-3 upshift is effected in the POWER-OFF state, is provided to determine whether a FLAG XCNCLINN is off or not. The flag XCN-CLINN is initially reset to be off and is subsequently turned on in step S12 or S16 of FIG. 10. When a negative decision (NO) is obtained in step S3, the control flow goes to step S3 to turn on a flag XAPROK, and then to step S17 of FIG. 10 to determine whether the flag XAPROK is on or not. If an affirmative decision (YES) is obtained in step S17, the control flow goes to step S18 wherein the 2-3 shift valve 71 is switched to supply a pressurized fluid to the hydraulic cylinder 54 of the brake B2, for engaging the brake B2. If a negative decision (NO) is obtained in step S17, the control flow goes to step S19 wherein the 2-3 shift valve 71 is switched to drain the hydraulic cylinder 54 for holding the brake B2 in the released state. The 2-3 shift valve 71 is controlled by energizing and de-energizing the solenoid-operated valve SL1.

Since the flag XCNCLINN is initially off, step S2 implemented when the 2-3 upshift is commanded at the point of time t2 in the POWER-OFF state (after the point of time t1) as indicated in FIG. 11 is followed by step S4 to first calculate a rate of change $\Delta N_{CO}$ of the input speed $N_{CO}$, and then calculate a synchronizing time A1 according to the following equation (1). The synchronizing time A1 is a time required for the input speed $N_{CO}$ to reach the synchronizing speed ($N_{OUT} \times \gamma 3$) of the third-speed position "3rd" which is established by the 2-3 upshift.

$$A1 = (N_{OUT} \times \gamma 3 - N_{CO})/\Delta N_{CO} \qquad (1)$$

The rate of change $\Delta N_{CO}$ is calculated by subtracting the previous input speed $N_{COn-1}$ detected in the last control cycle from the present input speed $N_{COn}$ detected in the present control cycle. In the above equation (1), "$\gamma 3$" represents the speed ratio of the third-speed position "3rd" of the automatic transmission 14, namely, the input speed $N_{CO}/N_{OUT}$ when the automatic transmission 14 is placed in the third-speed position "3rd". The synchronizing speed ($N_{OUT} \times \gamma 3$) is obtained on the basis of the presently detected output speed $N_{OUT}$.

The above equation (1) is formulated to obtain the synchronizing time A1 by dividing a difference between the synchronizing speed ($N_{OUT} \times \gamma 3$) and the presently detected input speed $N_{CO}$, by the rate of change $\Delta N_{CO}$. This equation (1) is based on an assumption that the vehicle speed V, that is, the synchronizing speed ($N_{OUT} \times \gamma 3$) is held substantially constant. However, the synchronizing time A1 can be obtained with higher accuracy, by taking into account a rate of change $\Delta N_{OUT}$ of the output speed $N_{OUT}$, or a rate of change $\Delta(N_{OUT} \times \gamma 3)$ of the synchronizing speed ($N_{OUT} \times \gamma 3$).

It will be understood that a portion of the transmission controller 179 assigned to implement step S4 functions as synchronizing time estimating means for estimating a synchronizing time required for the input speed $N_{CO}$ of the automatic transmission 14 to reach the synchronizing speed of the operating position to which the automatic transmission 14 is shifted up during running of the vehicle in the POWER-OFF state. In FIG. 11, "$\gamma 2$" represents the speed ratio of the second-speed position "2nd" from which the automatic transmission 14 is shifted up to the third-speed position "3rd".

Step S4 is followed by step S5 to determine whether the synchronizing time A1 is shorter than a sum (B1+C1) of a predetermined stroking time B1 and an additional time C1. The stroking time B1 is a time required for the piston of the hydraulic cylinder 54 of the brake B2 to reach the engaging stroke end, while the additional time C1 is a time for preventing an erroneous determination as to whether the synchronizing time A1 is shorter than the stroking time B1. The stroking time B1 varies with the line pressure PL in the hydraulic control device 184, which in turn is controlled by the linear solenoid valve SLT, depending upon the throttle opening angle $\theta_{TH}$. Since step S5 is implemented only when the throttle opening angle $\theta_{TH}$ is substantially zero, the stroking time B1 corresponding to the line pressure PL when the throttle opening angle $\theta_{TH}$ is zero is stored in the memory device 188 (FIG. 3). In this respect, it is noted that the memory device 188 is not cleared even when power is removed from the memory device 188. The stroking time B1 may be stored in the RAM or ROM of the transmission controller 178, rather than the memory device 188. It will be understood that the memory device 188 serves as a time data memory storing the predetermined stroking time B1. The memory device 188 may store data representing various values of the stroking time B1 corresponding to respective different values of the temperature of the working fluid in the hydraulic control device 184.

If a negative decision (NO) is obtained in step S5, that is, if A1≧B1+C1, the control flow goes to step S6 to turn off the flag XAPROK, turn on the flag XAPRDLY, and reset an auto-increment counter E1 to "0". Step S6 is followed by steps S17 and S19 of FIG. 10, so that the brake B2 is held in the released state. If an affirmative decision (YES) is obtained in step S5, that is, if A1<B1+C1, the control flow goes to step S7 to determine whether the content of the auto-increment counter E1 has exceeded than the additional time C1. The auto-increment counter E1 is provided to measure a time lapse after the affirmative decision (YES) is obtained in step S5. If a negative decision (NO) is obtained in step S7, the control flow goes to step S9 in which the flag XAPROK is turned off while the flag XAPRDLY is turned on. Step S9 is repeatedly implemented until an affirmative decision (YES) is obtained in step S7. Step S9 is followed by steps S17 and S19, so that the brake B2 is held in the released state.

If the content of the auto-increment counter E1 has exceeded the additional time C1, that is, the affirmative decision (YES) is continuously obtained in step S5 for the additional time C1, the control flow goes to step S8 to turn on the flag XAPROK, turn off the flag XAPRDLY and turn on the flag XCNCLINN. Step S8 is followed by steps S17 and S18, so that the supply of the pressurized fluid to the hydraulic cylinder 54 of the brake B2 is initiated. Thus, the 2-3 shift valve 71 is switched to initiate the supply of the pressurized fluid to the hydraulic cylinder 54 when the synchronizing time A1 has become substantially coincident with the stroking time B1. This control arrangement to initiate the supply of the pressurized fluid to the hydraulic cylinder 54 at the above-indicated point of time permits the piston of the hydraulic cylinder 54 to reach the engaging stroke end at a point of time which is substantially coincident with the point of time at which the input speed $N_{CO}$ has reached the synchronizing speed ($N_{OUT} \times \gamma 3$). Accordingly, the generation of the engaging force of the brake B2 is initiated at a constant point of time, even if the rate of change $\Delta N_{CO}$ of the input speed $N_{CO}$ fluctuates due to a variation in the operating characteristics of the engine 10.

In the time chart of FIG. 11, "t3" represents a moment at which the affirmative decision (YES) is obtained in step S5, and "t4" represents a moment at which the affirmative decision (YES) is obtained in step S7, while "t5" represents a moment at which the input speed $N_{CO}$ has substantially reached the synchronizing speed ($N_{OUT} \times \gamma 3$), and the piston of the hydraulic cylinder 54 has reached the engaging stroke end to initiate a rise of the engaging hydraulic pressure $P_{B2}$ of the brake B2 and thereby initiate the generation of the engaging force of the brake B2. "B1" and "C1" in FIG. 11 represent the stroking time B1 and the additional time C1, respectively.

It will be understood that a portion of the transmission controller 178 assigned to implement step S5–S9 and S17–S19 functions as timing determining means for determining a point of time at which the supply of the pressurized fluid to the hydraulic cylinder 54 should be initiated. It will also be understood that the affirmative decisions (YES) obtained in steps S5 and S7 are considered to be a condition that should be satisfied to initiate the supply of the pressurized fluid to the hydraulic cylinder 54. Once the affirmative decision (YES) has been obtained in both steps S5 and S7 and the supply of the pressurized fluid to the hydraulic cylinder 54 has been initiated in step S18, steps S1, S2, S3, S17 and S18 are repeatedly implemented since the flag XCNCLINN is turned on in step S8 following step S7.

If the negative decision (NO) is obtained in step S1, that is, if the vehicle is placed in the POWER-ON state in which the accelerator pedal is in operation or the idling detector switch is off, the control flow goes to step S10 to determine whether the flag XAPROK is off. If an affirmative decision (YES) is obtained in step S10, step S11 is implemented. If a negative decision (NO) is obtained in step S10, namely, the supply of the pressurized fluid to the hydraulic cylinder 54 has already been initiated, the control flow goes to step S13 while skipping steps S11–13. Step S11 is provided to determine whether the flag XAPRDLY is on. If an affirmative decision (YES) is obtained in step S11, that is, if step S6 or S9 has been implemented, the control flow goes to step s12 to turn off the flag XAPRDLY and turn on the flags XCN-CLINN and XAPROK. With the flag XCNCLINN turned on in step S12, step S2 is followed by step S3 to continue the supply of the pressurized fluid to the hydraulic cylinder 54, even if the affirmative decision (YES) is subsequently obtained in step S1, that is, even if the accelerator pedal is again released. If a negative decision (NO) is obtained in step S11, that is, step S6 or S9 has not been implemented before step S10 is implemented, it means that a command to effect the 2-3 upshift is generated while the vehicle is in the POWER-ON state. In this case, the control flow goes to step S13 to turn on the flag XAPROK.

Therefore, when the vehicle is placed in the POWER-ON state, the flag XAPROK is turned on irrespective of whether the flag XAPRDLY is on or off. Accordingly, step S18 is implemented to supply the pressurized fluid to the hydraulic cylinder 54 to engage the brake B2 immediately after the vehicle is brought to the POWER-ON state.

Steps S10–S13 are followed by step S14 to determine whether the flag XCNCLINN is off. If a negative decision (NO) is obtained in step S14, the control flow goes to steps S17 and S18 while skipping steps S15 and S16, so that the pressurized fluid is supplied to the hydraulic cylinder 54 in step S18. If an affirmative decision (YES) is obtained in step S14, the control flow goes to step S15 to determine whether a predetermined stroking time D1 has passed after the moment of initiation of the supply of the pressurized fluid to the hydraulic cylinder 54. Like the stroking time B1 described above, the stroking time D1 is a time required for the piston of the hydraulic cylinder 54 to reach the engaging stroke end. The stroking time D1 is stored in the memory device 188, in relation to the throttle opening angle $\theta_{TH}$. The time after the moment of initiation of the supply of the pressurized fluid to the hydraulic cylinder 54 may be measured by an increment counter or a timer which is adapted to measure a time after the affirmative decision (YES) is obtained in step S17. When the time thus measured has reached the predetermined stroking time D1, the flag XCN-CLINN is turned on in step S16.

Thus, if the accelerator pedal 150 is released before the stroking time D1 has passed after the supply of the pressurized fluid to the hydraulic cylinder 54 is initiated in the process of the 2-3 upshift in the POWER-ON state, the affirmative decision (YES) is obtained in step S2, and step S4 and subsequent steps are implemented so that the hydraulic cylinder 54 is drained in step S19 since the flag XAPROK is turned off in step S6 or S9. The supply is initiated in step S18 to engage the brake B2, only after the condition for initiating the supply has been satisfied, that is, only when the affirmative decision (YES) is obtained in steps S5 and S7, namely, at a point of time at which the input speed $N_{CO}$ has substantially reached the synchronizing speed. This arrangement prevents a shifting shock of the automatic transmission 14 due to an abrupt engagement of the brake B2 while the vehicle is brought back to the POWER-OFF state. When the stroking time D1 has passed after the initiation of the supply of the fluid to the hydraulic cylinder 54, the piston has already reached the stroke end. In view of this fact, the flag XCNCLINN is turned on in step S16 when the stroking time D1 has passed, whereby the pressurized fluid is held supplied to the hydraulic cylinder 54 even after the accelerator pedal 50 is released after the stroking time D1 has passed.

In the present embodiment, the 2-3 shift valve 71 is switched to supply the pressurized fluid to the hydraulic cylinder 54 when the affirmative decision (YES) is obtained in both of steps S5 and S7, that is, only after the required synchronizing time A1 has become substantially equal to the predetermined required stroking time B1, where a command to effect the 2-3 upshift of the automatic transmission 14 is generated while the vehicle is running in the POWER-OFF state. This control arrangement permits the piston of the hydraulic cylinder 54 to reach the engaging stroke end to initiate the generation of the engaging force of the brake B2, at a point of time substantially coincident with the point of time at which the input speed $N_{CO}$ has reached the synchronizing speed ($N_{OUT} \times \gamma 3$). This advantage is provided irrespective of a variation in the rate of change $\Delta N_{CO}$ of the input speed $N_{CO}$, which would take place due to a variation in the operating characteristics of the engine 10. The instant control arrangement is effective to minimize the unexpected acceleration or deceleration of the vehicle which would occur due to the generation of the engaging force of the brake B2 considerably before or after the moment of initiation of the supply of the pressurized fluid to the hydraulic cylinder 54, which would be caused by a difference between the moment at which the input speed $N_{CO}$ has reached the synchronized speed, and the moment at which the piston of the hydraulic cylinder 54 has reached the engaging stroke end.

In particular, step S7 is provided to permit the initiation of the supply of the pressurized fluid to the hydraulic cylinder 54 only after the condition of step S5 has been satisfied for a time length equal to the additional time value C1. This arrangement prevents an erroneous determination as to whether the condition for initiating the supply has been satisfied or not, which erroneous determination would arise due to an erroneous detection of of the speeds $N_{CO}$, $N_{OUT}$, for example.

Referring next to FIGS. 12–15, there will be described another embodiment of the invention, which has the same arrangement as shown in FIGS. 1–8, but in which a routine different from that of FIGS. 9 and 10 is used for controlling a 2-3 upshift of the automatic transmission 14.

Figure 12:
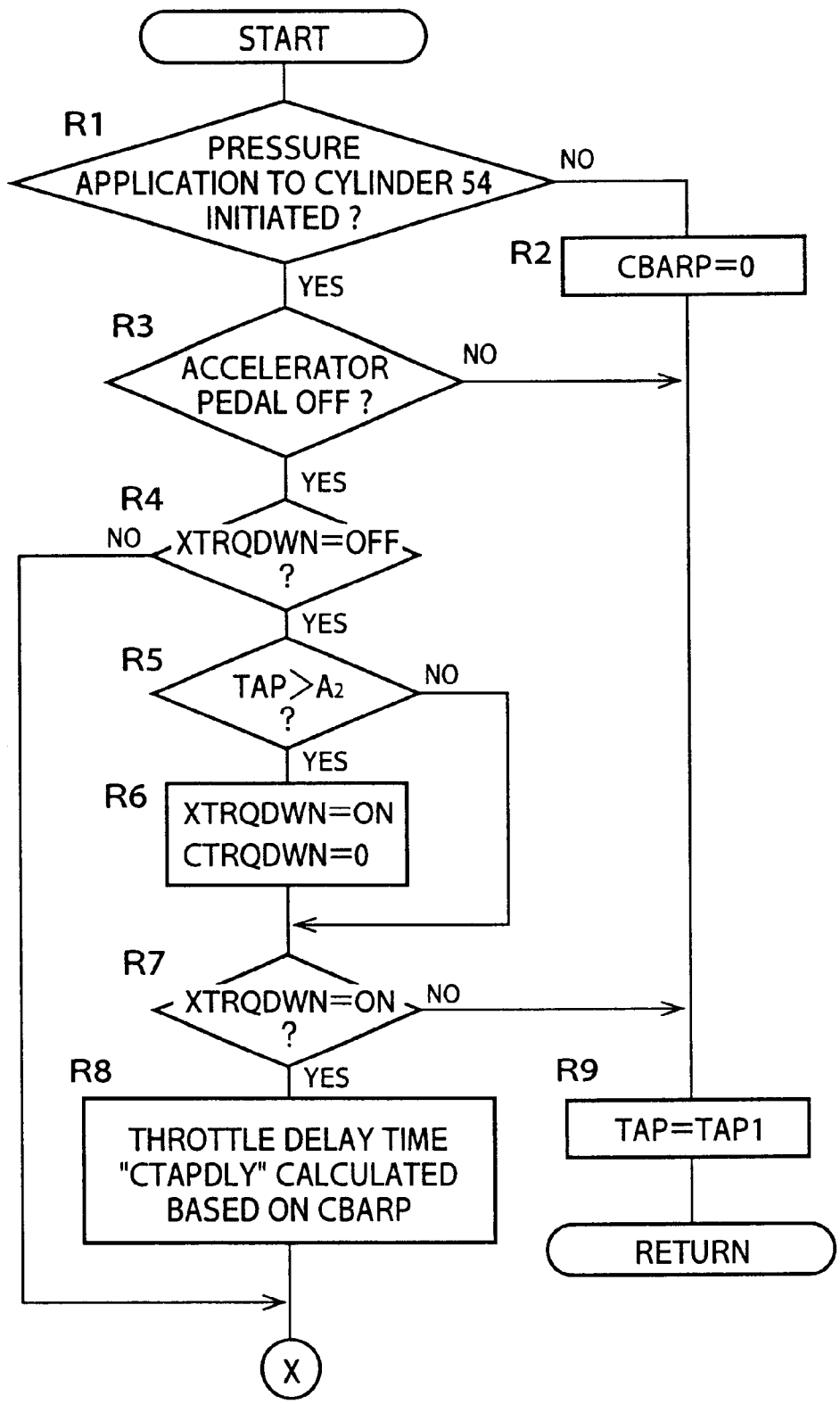
FIG. 12 is a flow chart illustrating a part of another routine executed by the transmission controller for controlling the 2-3 upshift.
Figure 13:
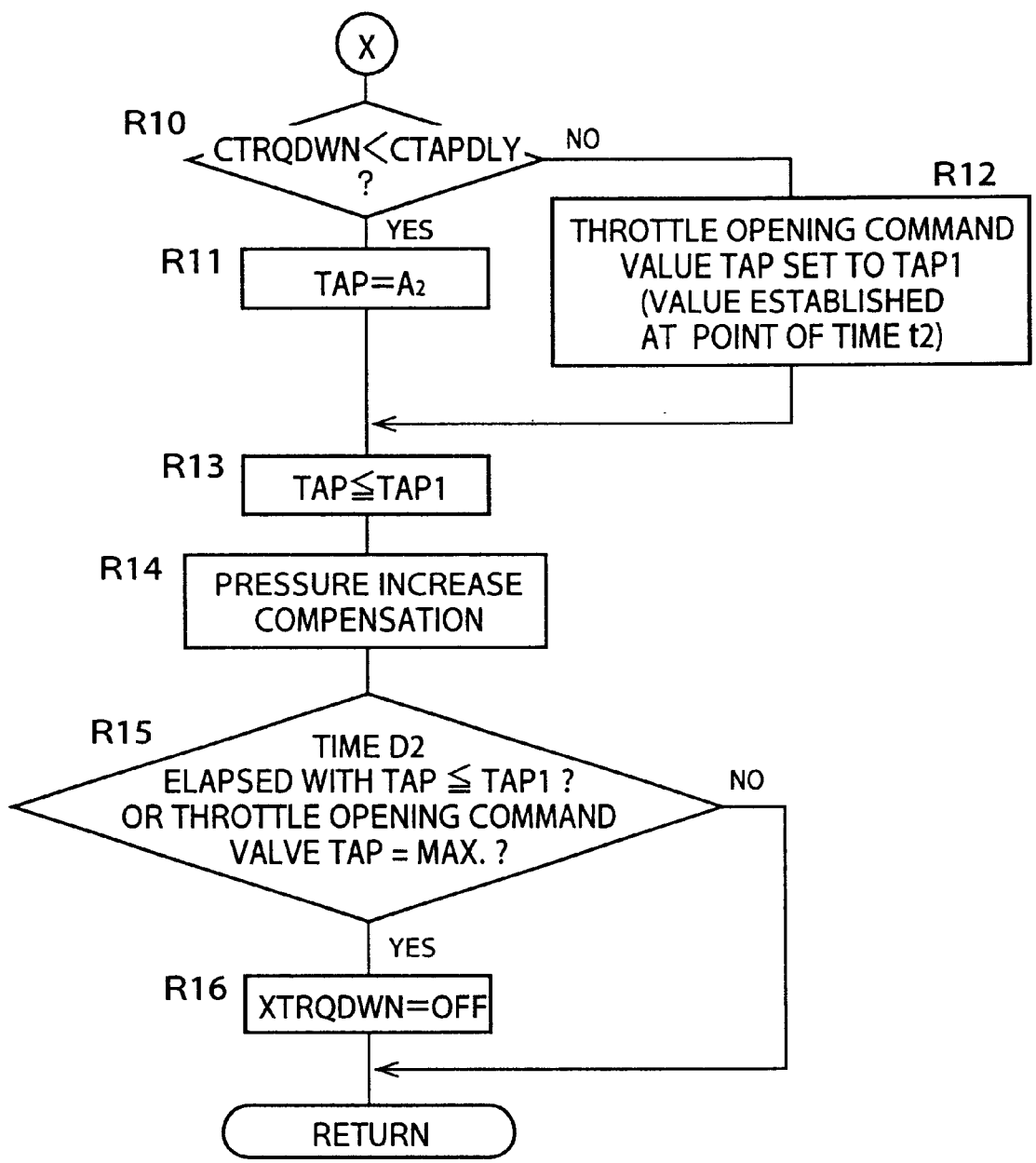
FIG. 13 is a flow chart illustrating the rest of the routine of FIG. 12.
Figure 14:
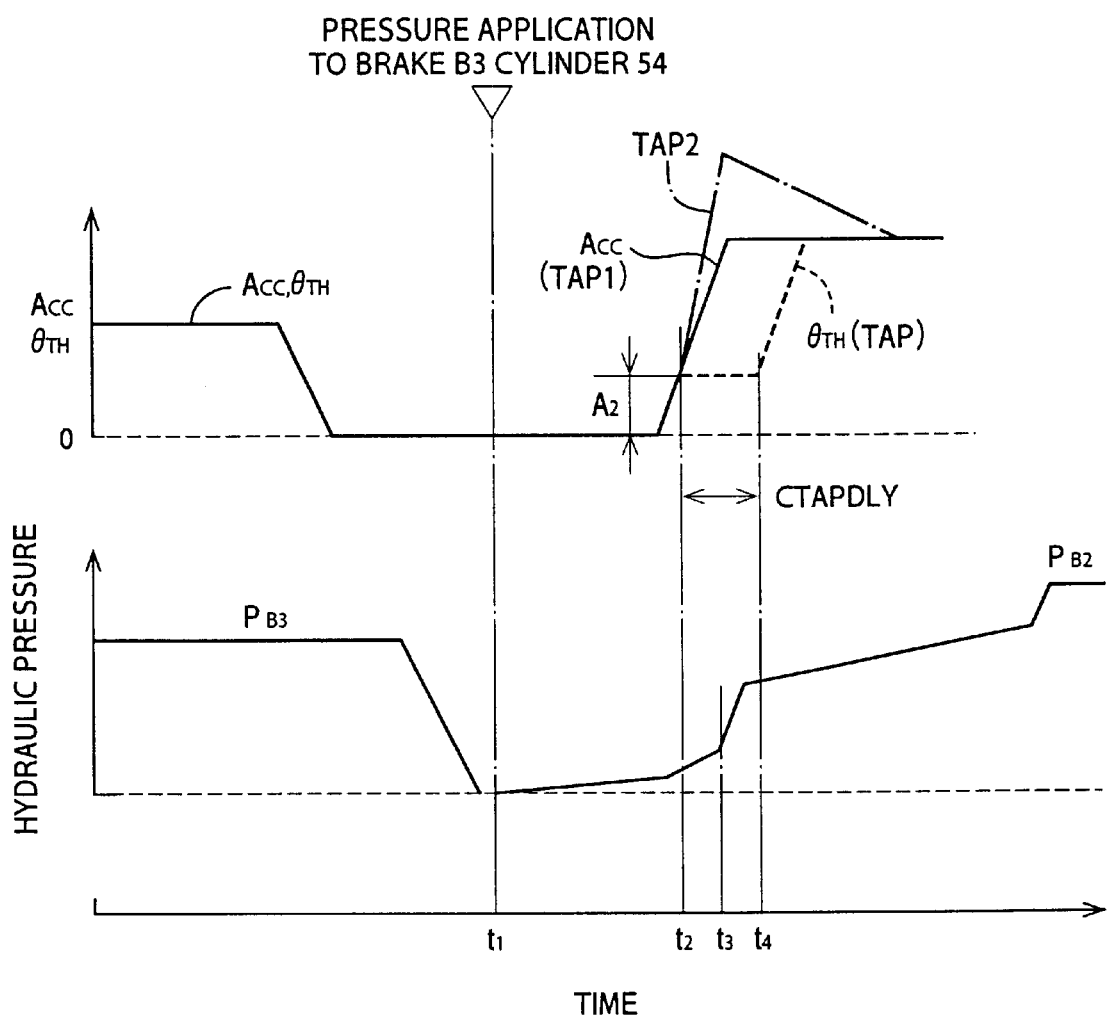
FIG. 14 is a time chart showing changes of various parameters, by way of example, when the 2-3 upshift is controlled according to the routine of FIGS. 12 and 13.

The flow charts of FIGS. 12 and 13 illustrate the routine executed by the electronic transmission controller 178 when a command to effect the 2-3 upshift of the automatic transmission 14 while the vehicle is placed in the POWER-OFF state in which the operating amount $A_{CC}$ of the accelerator pedal 150 is zero. This routine is repeatedly executed with a predetermined cycle time. The time chart of FIG. 14 shows changes of various parameters when the 2-3 upshift is controlled according to the routine of FIGS. 12 and 13. When the operating amount $A_{CC}$ of the accelerator pedal 150 is substantially zeroed, the brake B3 which has been engaged to establish the second-speed position "2nd" is released by the linear solenoid valve SLU provided to control the hydraulic pressure in the hydraulic cylinder 52. Then, at a point of time t1, the 2-3 shift valve 71 is switched to initiate the supply of the pressurized fluid to the hydraulic cylinder 54 of the brake B2. This point of time t1 corresponds to the point of time t4 indicated in FIG. 11 of the first embodiment. In this second embodiment, too, the brake B2 is a frictional coupling device which is engaged by an operation of the hydraulic cylinder 54 to establish the higher-gear position in the form of the third-speed position "3rd".

The routine of FIGS. 12 and 13 is initiated with step R1 to determine whether the 2-3 shift valve 71 has been switched to initiate the supply of the pressurized fluid to the hydraulic cylinder 54 of the brake B2. This determination may be made depending upon the operating state of the solenoid-operated valve SL1, for example. If a negative decision (NO) is obtained in step R1, the control flow goes to step R2 to reset an auto-increment counter CBARP to "0". Step R2 is followed by step R9 in which a command value TAP indicative of the desired or commanded throttle opening angle $\theta_{TH}$ of the throttle valve 156 is set to be TAP1 which is obtained on the basis of the detected operating amount $A_{CC}$ of the accelerator pedal 150 and according to the data map as indicated in the graph of FIG. 7. With the auto-increment counter CBARP reset to "0" in step R2, an affirmative decision (YES) is obtained in step R1 in the next control cycle after the supply of the pressurized fluid to the hydraulic cylinder 54 has been initiated. Accordingly, the control flow goes to step R3, and a time after the initiation of the supply of the pressurized fluid to the hydraulic cylinder 54 is measured by the auto-increment counter CBARP, since step R2 is not implemented thereafter. The throttle opening command value TAP (TAP1 in this case) is applied to the engine controller 176, which in turn controls the throttle actuator 154 to control the throttle valve 156 according to the throttle opening command value TAP, and at the same time controls the amount of fuel injection into the engine 10, for thereby controlling the output of the engine 10.

Step R3 is provided to determine whether the vehicle is placed in the POWER-OFF state after the supply of the pressurized fluid to the hydraulic cylinder 54 has been initiated (after the affirmative decision has been obtained in step R1). This determination is made by determining whether the operating amount $A_{CC}$ of the accelerator pedal 150 is substantially zero, or whether the brake B3 has already been released. If a negative decision (NO) is obtained in step R3, the control flow goes to step R9. If an affirmative decision (YES) is obtained in step R3, the control f low goes to step R4 to determine whether a flag XTRQDWN is off. This flag XTRQDWN is initially reset to be off. When this flag is on, it indicates that the throttle valve 156 is under a throttle limiting control which will be described. When step R4 is implemented for the first time, an affirmative decision (YES) is obtained in step R4, and the control flow goes to step R5.

Step R5 is provided to determine whether the throttle opening command value TAP is larger than a predetermined threshold A2. This threshold A2 is used for determining whether the accelerator pedal 150 has been operated. The threshold A2 is small enough to prevent deterioration of the durability of the friction members of the brake B2 due to application of an engine torque corresponding to the threshold A2 while the brake B2 is in a partially slipping state. If a negative decision (NO) is obtained in step R5, the control flow goes to step R7 while skipping step R6. If an affirmative decision (YES) is obtained in step R5, the control flow goes to step R6 to turn on the flag XTRQDWN and reset an auto-increment counter CTRQDWN to "0". With the flag XTRQDWN turned on, a negative decision (NO) is obtained in step R4 in the subsequent control cycles, and the control flow goes to step R10 and subsequent steps while skipping steps R5–R9, so that the throttle limiting control is implemented. Since step R6 is not implemented, the auto-increment counter CTRQDWN starts measuring a time after the affirmative decision (YES) is obtained in step R5, that is, a time after the throttle opening command value TAP has exceeded the threshold A2 and the throttle limiting control has been initiated. Namely, the auto-increment counter CTRQDWN is provided to measure a throttle limiting control time during which the throttle opening angle $\theta_{TH}$ is limited according to the throttle limiting control. Point of time t2 in FIG. 14 represents a moment at which the throttle opening command value TAP has exceeded the threshold A2 and the affirmative decision (YES) is obtained in step R5.

Figure 15:
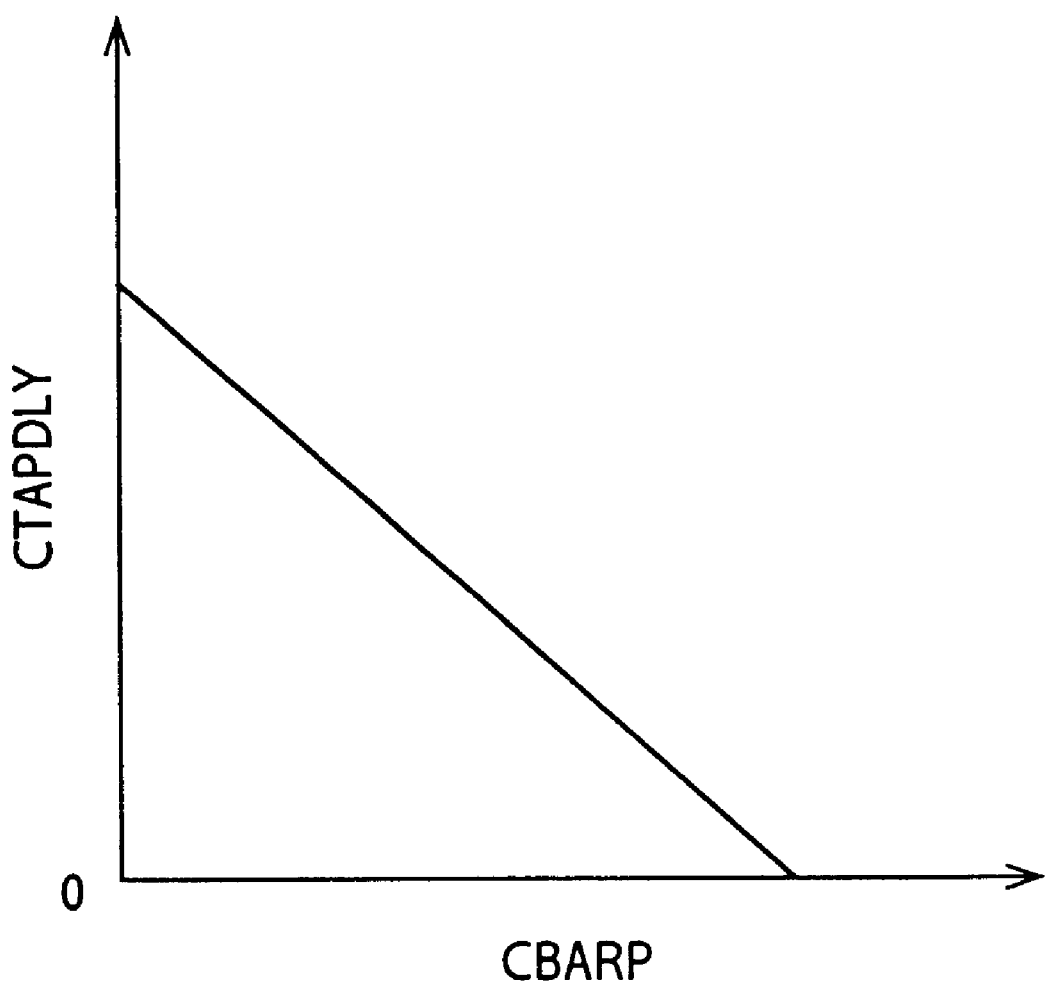
FIG. 15 is a graph indicating a relationship between a throttle delay time CTAPDLY calculated in step R8 of the routine of FIG. 12, and the content of a counter CBARP.

Step R6 is followed by step R7 to determine whether the flag XTRQDWN is on. If a negative decision (NO) is obtained in step R7, the control flow goes to step R9. If an affirmative decision (YES) is obtained in step R7, the control flow goes to step R8 in which a throttle delay time CTAPDLY is calculated on the basis of the time measured by the auto-increment counter CBARP, and according to a stored equation or data map which represents a predetermined relationship between the throttle delay time CTAPDLY and the time measured by the counter CBARP, as shown in the graph of FIG. 15, by way of example. The equation or data map is stored in the memory device 188. As described above, the time measured by the auto-increment counter CBARP is the time which has passed after the moment of initiation of the supply of the pressurized fluid to the hydraulic cylinder 54. The throttle delay time CTAPDLY is determined such that the throttle delay time CTAPDLY decreases with an increase in the time measured by the auto-increment counter CBARP. The throttle delay time CTAPDLY is a time by which an increase in the throttle opening angle $\theta_{TH}$ and a corresponding increase in the output of the engine 10 is delayed by a minimum amount necessary to prevent the deterioration of durability of the friction members of the brake B2, even if the accelerator pedal 150 is operated. In this respect, it is noted that the distance of movement of the piston of the hydraulic cylinder 54 toward its engaging stroke end increases with an increase in the time which has passed after the initiation of the supply of the pressurized fluid to the hydraulic cylinder 54, and that the time required for the brake B2 to generate the required engaging force without deterioration of the durability of its friction members decreases as the above-indicated time is increased. In view of this fact, the throttle delay time CTAPDLY is reduced as the time measured by the counter CBARP increases. When the throttle delay time CTAPDLY is zeroed, the throttle limiting control is not substantially implemented. That is, the throttle limiting control is implemented only where the time from the moment of initiation of the supply of the pressurized fluid to the hydraulic cylinder 54 to the moment of operation of the accelerator pedal 150 is comparatively short. The throttle delay time CTAPDLY is considered to be a torque limiting time during which the input torque of the automatic transmission 14 is limited by the throttle limiting control.

It is possible that an increase in the output of the engine 10 is delayed, even if the accelerator pedal 150 is operated, until the time measured by the auto-increment counter CBARP (time after the initiation of the supply of the pressurized fluid to the hydraulic cylinder 54) has reached a suitable value (e.g., time between t1 and t4 indicated in FIG. 14) which is determined so as to prevent deterioration of durability of the friction members of the brake B2. The routine may be modified such that if the negative decision (NO) is obtained in step R5, the control flow goes directly to step R9, while skipping step R7.

Step R10 (FIG. 13) is provided to determine whether the throttle limiting control time measured by the auto-increment counter CTRQDWN is shorter than the determined throttle delay time CTAPDLY. As long as the throttle limiting control time is shorter than the throttle delay time CTAPDLY, step R11 is repeatedly implemented so that the throttle opening command value TAP is held at the constant value A2. As a result, an increase in the output of the engine 10 is limited even when the accelerator pedal 150 is operated. Accordingly, the input torque of the automatic transmission 14 is limited, in order to prevent deterioration of the durability of the friction members of the brake B2 whose torque capacity is still insufficient.

It will be understood that a portion of the transmission controller 178 assigned to implement steps R10 and R11 functions as input torque limiting means, which is operated in response to an increase in the operating amount $A_{CC}$ of the accelerator pedal 150 in the process of an upshift of the automatic transmission 14 during running of the vehicle in the POWER-OFF state, for limiting an input torque of the automatic transmission 14 for a length of time necessary to permit the brake b2 to have a torque capacity sufficient to-prevent deterioration of its durability.

When the measured throttle limiting control time CTRQDWN has reached the determined throttle delay time CTAPDLY, a negative decision (NO) is obtained in step R10, and the control flow goes to step R12 in which the throttle opening command value TAP is set to be TAP1 which corresponds to the operating amount $A_{CC}$ of the accelerator pedal 150 which was established the throttle delay time CTAPDLY prior to the present point of time, that is, established at point of time t2. Thus, an increase of the throttle opening command value TAP to the value TAP1 corresponding to the increased operating amount $A_{CC}$ is delayed by the determined throttle delay time CTAPDLY.

Point of time t4 in FIG. 14 represents the moment at which the negative decision (NO) is obtained in step R10 and step R12 is implemented to increase the throttle command value TAP to TAP1. Point of time t3 represents the moment at which the piston of the hydraulic cylinder 54 of the brake B2 has reached the engaging stroke end. At this point of time t3, the engaging hydraulic pressure $P_{B2}$ begins to rise, with an effect of the accumulator 121, so that the torque capacity (engaging torque) of the brake B2 increases with the rise of the engaging pressure $P_{B2}$. The throttle delay time CTAPDLY is determined by experimentation, for example, while taking into account the required stroking time of the piston of the hydraulic cylinder 54, as adjusted by the hydraulic pressure compensation in step R14, so that the negative decision (NO) is obtained in step R10 to implement step R12, after the point of time t3.

Step R11 and R12 are followed by step R13 in which the throttle opening command value TAP is held equal to or smaller than the value TAP1 determined by the presently detected operating amount $A_{CC}$ of the accelerator pedal 150. That is, if the command value TAP is larger than TAP1, the command value TAP is limited to the value TAP1.

Step R13 is followed by step R14 in which the line pressure PL in the hydraulic control device 184 and the B2 accumulator control pressure (back pressure) $P_{ac}$ are temporarily increased so that the pressurized fluid is rapidly supplied to the hydraulic cylinder 54. Described more specifically, the line pressure PL and the B2 accumulator control pressure $P_{ac}$ are normally controlled by the linear solenoid valves SLT and SLN, according to the throttle opening command value TAP or the detected throttle opening angle $\theta_{TH}$. In step R14, however, a compensated throttle opening command value TAP2 is obtained, for the purpose of temporarily increasing the pressures PL and $P_{ac}$ only, by multiplying the throttle opening command value TAP1 corresponding to the actual operating amount $A_{CC}$ of the accelerator pedal 150, by a predetermined compensating coefficient (larger than 1). On the basis of the thus obtained compensated throttle opening command value TAP2, the line pressure PL and the B2 accumulator control pressure $P_{ac}$ are increased. When the rate of increase of the operating amount $A_{CC}$ is zeroed, the compensated throttle opening command value TAP2 is reduced at a predetermined rate, and the line pressure PL and the B2 accumulator control pressure $P_{ac}$ are accordingly lowered.

It will be understood that a portion of the transmission controller 178 assigned to implement step R14 functions as hydraulic pressure compensating means operable when the input torque is limited by the input torque limiting means, for increasing the pressure in the hydraulic control device 184 to increase a rate of supply of the pressurized fluid to the hydraulic cylinder 54.

Step R14 is followed by step R15 to determine whether the throttle opening command value TAP has been held equal to or smaller than the value TAP1 corresponding to the operating amount $A_{CC}$ of the accelerator pedal 150, for a predetermined time D2, or the command value TAP is the maximum value. If an affirmative decision (YES) is obtained in step R15, the control flow goes to step R16 to turn off the flag XTRQDWN, for terminating the throttle limiting control in the process of the 2-3 upshift in the POWER-OFF state. The predetermined time D2 is determined so as to prevent an erroneous termination of the throttle limiting control, which would take place due to a hunting of the value TAP1 corresponding to the operating amount $A_{CC}$, as compared with respect to the throttle opening command value TAP, which hunting may occur when the operating amount $A_{CC}$ is alternately increased and decreased by a relatively short amount in a relatively short time by an intricate manipulation of the accelerator pedal 150 by the vehicle operator.

The present second embodiment of FIGS. 12–15 which has been described above is adapted to prevent deterioration of the durability of the friction members of the brake B2, owing to the throttle limiting control wherein the throttle opening command value TAP is held limited to the threshold value A2 for the predetermined throttle delay time CTAPDLY, where the accelerator pedal 150 is operated to increase the throttle opening angle $\theta_{TH}$ within the predetermined time (throttle delay time CTAPDLY) after the moment of initiation of the supply of the pressurized fluid to the hydraulic cylinder 54, in the process of the 2-3 upshift during running of the vehicle in the POWER-OFF state. Further, the throttle delay time CTAPDLY is determined to delay an increase in the output of the engine 10 for a minimum length of time required to prevent the deterioration of durability of the friction members of the brake B2. In other words, the throttle limiting control time is made as short as possible, in order to minimize a shortage in the vehicle drive force or deterioration of the vehicle drivability, upon operation of the accelerator pedal 150. In particular, the line pressure PL in the hydraulic control device 184 is temporarily raised during the throttle limiting control so that the pressurized fluid can be rapidly supplied to the hydraulic cylinder 54, to permit the brake B2 to be rapidly engaged to have the suitable torque capacity. Accordingly, the throttle limiting control time can be further shortened, and the shortage of the vehicle drive force is effectively ameliorated.

In addition, the throttle delay time CTAPDLY is determined on the basis of the time between the moment of initiation of the supply of the pressurized fluid to the hydraulic cylinder 54 and the moment of operation of the accelerator pedal 150, so that the throttle limiting control is effected for the determined throttle delay time CTAPDLY. Accordingly, the point of time at which the supply of the pressurized fluid to the hydraulic cylinder 54 is initiated can be set with an increased freedom, without deteriorating the vehicle drivability after the operation of the accelerator pedal 150 and the durability of the brake B2. Thus, the present embodiment is effective to prevent unexpected or undesirable acceleration and deceleration of the vehicle.

Since the durability of the brake B2 is improved by suitably limiting the throttle opening angle $\theta_{TH}$ and temporarily raising the line pressure PL, the brake B2 can be made structurally simpler, with a reduced number of the friction members, resulting in reduced weight and cost of manufacture of the brake B2, reduced variation in the operating characteristics and engaging shock of the brake B2, and improved operating reliability and performance of the brake B2.

Figure 16:
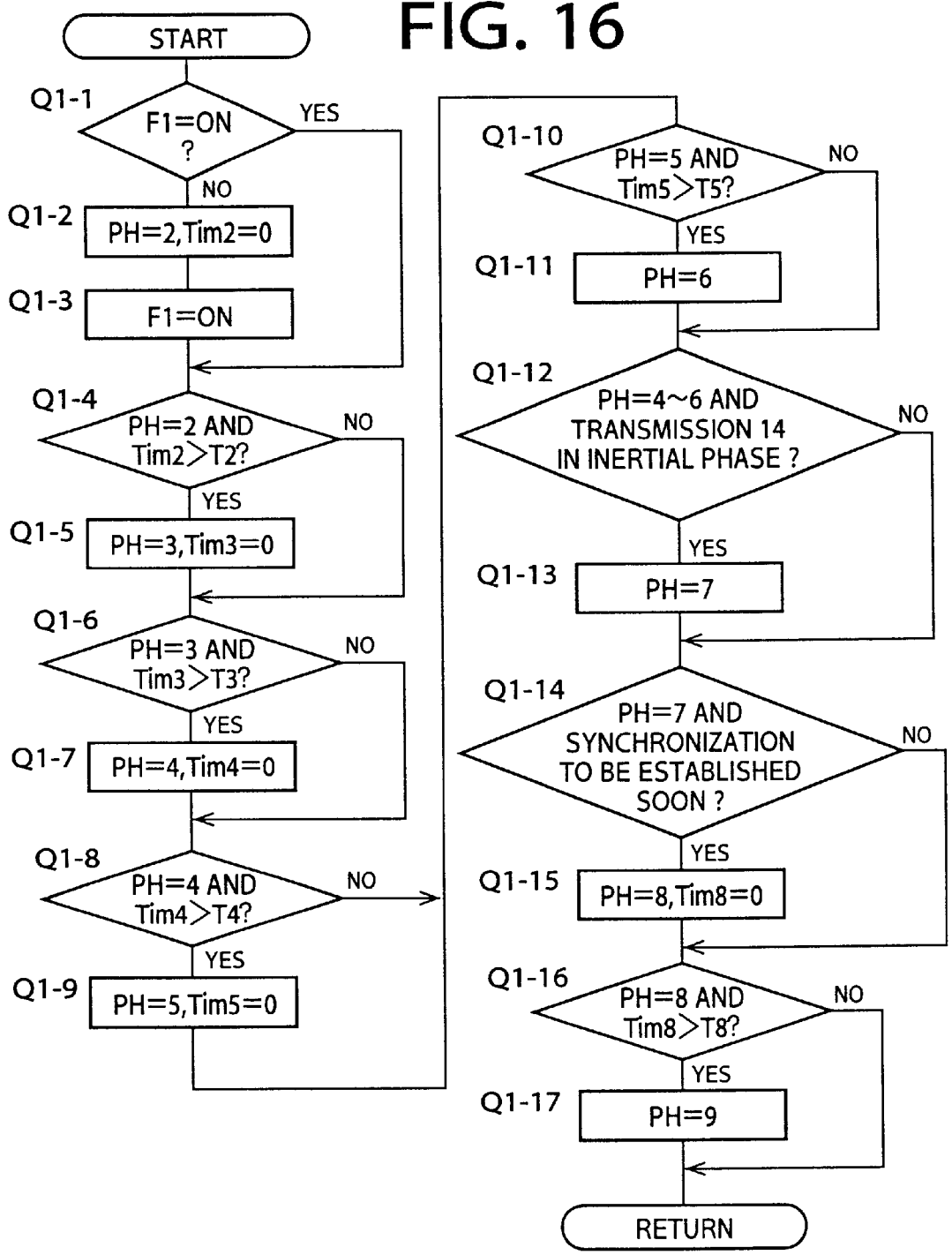
FIG. 16 is a flow chart illustrating a routine executed by the transmission controller for controlling a 1-2 upshift of the automatic transmission, wherein a control phase PH of a brake B3 is determined when the pressure in the brake B3 is directly controlled.
Figure 17:
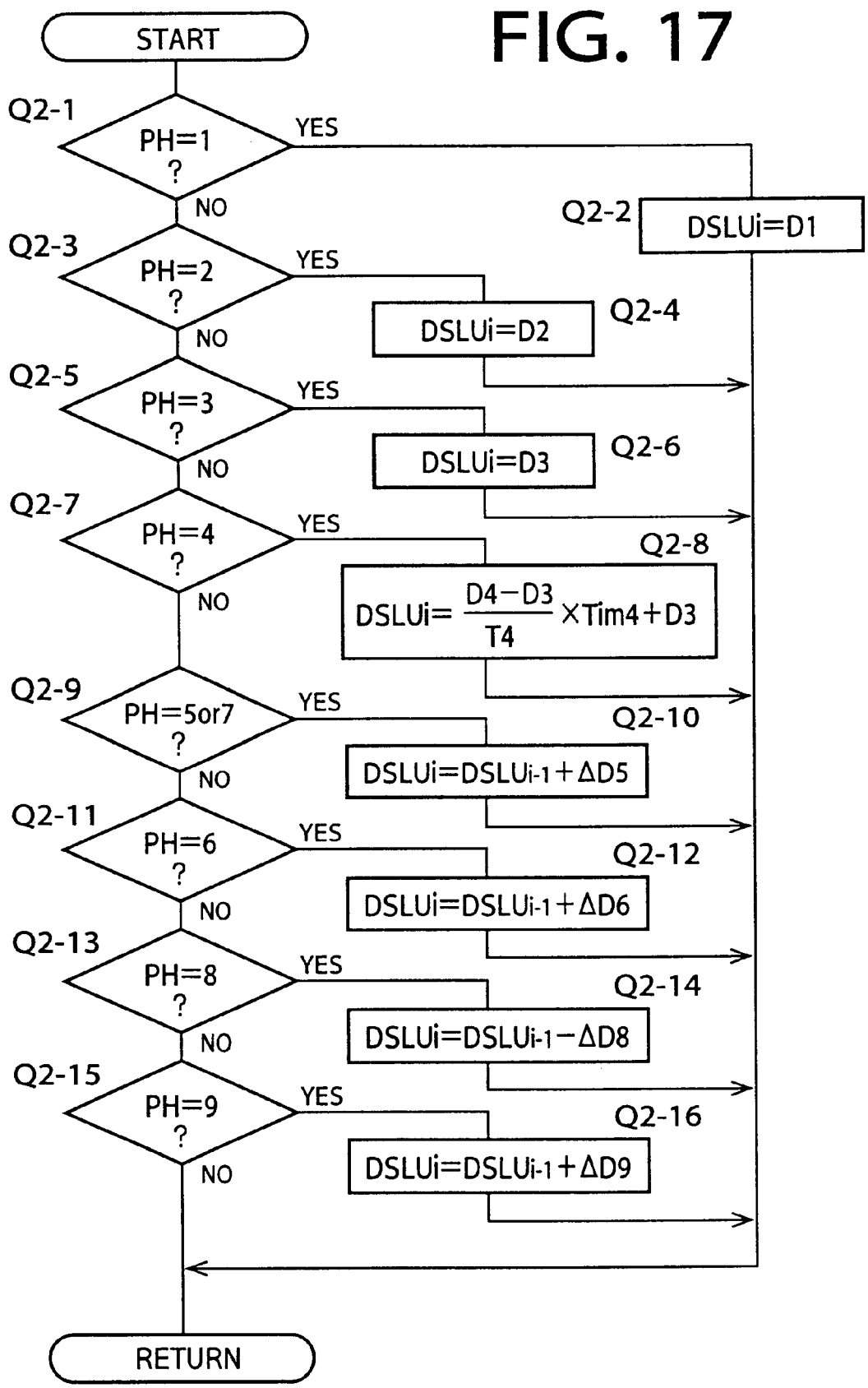
FIG. 17 is a flow chart illustrating a routine executed by the transmission controller for determining a duty ratio command value DSLU for a linear solenoid valve provided to directly control the pressure in the brake B3 in each control phase determined by the routine of FIG. 16.
Figure 18:
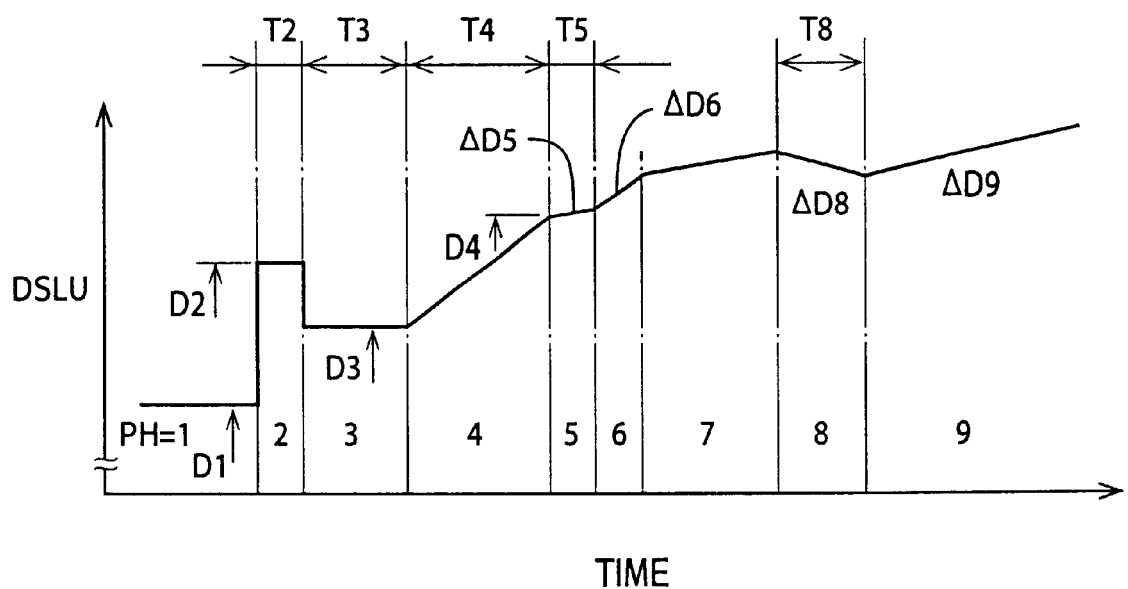
FIG. 18 is a view for explaining a basic pattern in which the pressure of the brake B3 is directly controlled according to the routines of FIGS. 16 and 17.

The flow charts of FIGS. 16 and 17 illustrate the routines to be executed by the electronic transmission controller 178 with a predetermined cycle time, to control the linear solenoid valve SLU for directly controlling the hydraulic pressure $P_{B3}$ of the hydraulic cylinder 52 of the brake B3, when the automatic transmission 14 is commanded to be shifted up from the first-speed position "1st" to the second-speed position "2nd". The time chart of FIG. 18 indicates a basic pattern of control of the pressure $P_{B3}$, more specifically, changes of a duty ratio command value DSLU for controlling the duty ratio of the linear solenoid valve SLU, in different control phases PH1–PH9. The control system includes a memory device 188 connected to the transmission controller 178, as shown in FIG. 3. The memory device 188 stores data representative of time lengths T2–T5 and T8, predetermined values D2–D4 of the duty ratio command value DSLU, and rates of change (increments or decrements) $\Delta D5$, $\Delta D6$, $\Delta D8$ and $\Delta D9$ of the command value DSLU. The values T2–T5, T8, D2–D4, $\Delta D5$, $\Delta D6$, $\Delta D8$ and $\Delta D9$ may be either fixed values (constants), or variables which change depending upon suitable parameters such as the throttle opening angle $\theta_{TH}$ and accelerator pedal operating amount $A_{CC}$ that represent the input torque of the automatic transmission 14. In the latter case, the memory device 188 stores data maps or mathematical equations which represent the variables and which are stored in the ROM of the transmission controller 178.

Figure 19:
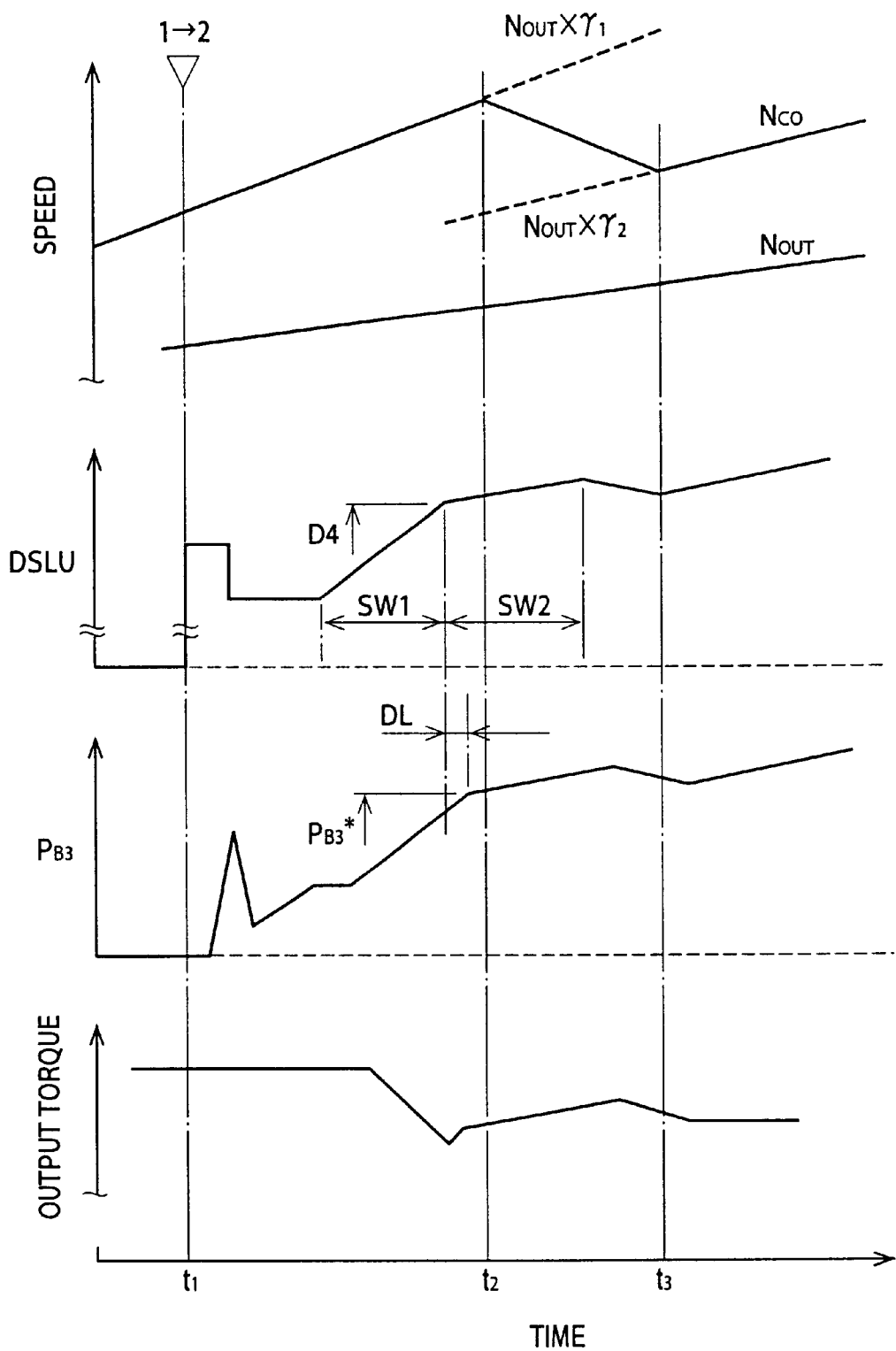
FIG. 19 is a time chart showing changes of various parameters, by way of example, when the pressure is controlled according to the routines of FIGS. 16 and 17.

The time chart of FIG. 19 shows changes of various parameters, by way of example, when the hydraulic pressure $P_{B3}$ is controlled upon the 1-2 upshift action of the automatic transmission 14. Point of time t1 indicated in FIG. 12 is a moment at which the 1-2 shift valve 70 is switched to apply the pressurized fluid to the hydraulic cylinder 52 of the brake B3 in response to a 1-2 upshift command which is applied from the transmission controller 178 to the hydraulic control device 184. The 1-2 shift valve 70 is switch by controlling the solenoid-operated valve SL2. It will be understood from the time chart of FIG. 19 that the pressure $P_{B3}$ (engaging pressure) of the brake B3 changes following the command value DSLU, with a certain delay time DL.

The routine illustrated in the flow chart of FIG. 16 is formulated to determine the present control phase PH of the duty ratio command value DSLU, and is initiated upon generation of the 1-2 upshift command at the point of time t1 (FIG. 12). The routine is initiated with step Q1-1 to determine whether a flag F1 is ON. If an affirmative decision (YES) is obtained in step Q1-1, the control flow goes to step Q1-4. Since the flag F1 is initially OFF, a negative decision (NO) is obtained when step Q1-1 is implemented for the first time, and the control flow to step Q1-2 to set the control phase PH as PH2, namely, select the control phase PH2, and reset a timer Tim2 for measuring the time lapse. Step Q1-2 is followed by step Q1-3 to turn ON the flag F1, so that the control flow goes to step Q1-4 when step Q1-1 is implemented in the next cycle of execution of the routine.

Step Q1-4 is provided to determine whether the presently selected control phase PH is PH2 while the time measured by the timer Tim2 has exceeded a predetermined threshold T2. If an affirmative decision (YES) is obtained in step Q1-4, the control flow goes to step Q1-5 to select the control phase PH3 and reset a timer Tim3 for measuring the time lapse. Like step Q1-4, subsequent steps Q1-6, Q1-8, Q1-10 and Q1-16 are formulated to check the presently selected control phase and the time lapse, for determining whether the next control phase should be selected. Like step Q1-5, subsequent steps Q1-7 and Q1-9 are formulated to select the respective control phases PH4 and PH5 as the next control phase PH and reset a timer Tim4 or Tim5 for measuring the time lapse. Steps Q1-11 and Q1-17 are formulated to select the respective control phases PH6 and PH9 as the next control phase PH.

Step Q1-12 is formulated to determine whether the presently selected control phase PH is one of the control phases PH4, PH5 and PH6, while at the same time the automatic transmission 14 is in the inertia phase. If an affirmative decision (YES) is obtained in step Q1-12, the control flow goes to step Q1-13 to select the control phase PH7. A determination in step Q1-12 as to whether the automatic transmission 14 is in the inertia phase, that is, whether the transmission 14 has entered the inertia phase is made by determining whether the following inequality (2) is satisfied or not:

$$N_{CO} < N_{OUT} \times \gamma 1 - A3 \qquad (2)$$

wherein $\gamma 1$ represents the speed ratio ($N_{CO}/N_{OUT}$) of the first-speed position "1st" of the automatic transmission, and A3 represents an error preventive value for preventing an erroneous determination regarding the inertia phase, due to detection errors of the input and output shaft speeds $N_{CO}$ and $N_{OUT}$ detected by the input shaft speed sensor 173 and the vehicle speed sensor 166.

Point of time t2 in the time chart of FIG. 19 is a moment at which the automatic transmission 14 has entered the inertia phase. In the example of FIG. 19, the control phase PH is changed from PH5 to PH7.

Step Q1-14 is formulated to determine whether the control phase PH7 is presently selected and the synchronization of the automatic transmission 14 is considered to be established soon. If an affirmative decision (YES) is obtained in step Q1-14, the control flow goes to step Q1-15 to select the control phase PH8 and reset a timer Tim8 for measuring the time lapse. A determination as to whether the synchronization is considered to be established soon is made by determining whether the following inequality (3) is satisfied:

$$B3 > (N_{OUT} \times \gamma 2 - N_{CO})/\Delta N_{CO} \qquad (3)$$

wherein $\gamma 2$ represents the speed ratio of the second-speed position "2nd" of the automatic transmission 14, and $\Delta N_{CO}$ represents a rate of change of the input shaft speed $N_{CO}$. The rate of change $\Delta N_{CO}$ may be obtained by subtracting the previous input shaft speed $N_{CO_{n-1}}$ detected in the last control cycle from the present input shaft speed $N_{CO_n}$ detected in the present control cycle. A value ($N_{OUT} \times \gamma 2 - N_{CO})/\Delta N_{CO}$ represents a time required for the post-upshift synchronizing speed ($N_{OUT} \times \gamma 2$) to be reached or established. If this required time becomes shorter than a predetermined threshold B3. The time required for the synchronization to be established may be calculated with higher accuracy, if the determination is based on a rate of change $\Delta N_{OUT}$ of the output shaft speed $N_{OUT}$, or a rate of change $\Delta(N_{OUT} \times \gamma 2)$ of the synchronizing speed ($N_{OUT} \times \gamma 2$).

As the control phase PH is selected according to the routine of FIG. 16, the duty ratio command value DSLU is controlled according to the routine of FIG. 17, in the selected control phase. The routine of FIG. 17 is initiated with step Q2-1 to determine whether the control phase PH2 is presently selected. If an affirmative decision (YES) is obtained in step Q2-1, the control flow goes to step Q2-2 to set the present duty ratio command value DSLUi of the linear solenoid valve SLU to a value D1. The value D1 is a predetermined, relatively small value (which is zero or close to zero). Since the control phase PH1 is not selected according to the routine of FIG. 16, a negative decision (NO) is obtained in step Q2-1, and the control flow goes to step Q2-3.

Step Q2-3 is provided to determine whether the control phase PH2 is presently selected. If an affirmative decision (YES) is obtained in step Q2-3, step Q2-4 is implemented to set the present duty ratio command value DSLUi to a value D2. In the control phase PH2, the linear solenoid valve SLU is controlled so as to effect a fast fill of the hydraulic cylinder 52. To this end, the value D2 is a comparatively large value, for instance, the maximum duty ratio value of the valve SLU.

If a negative decision (NO) is obtained in step Q2-3, the control flow goes to step Q2-5 to determine whether the control phase PH3 is presently selected. If an affirmative decision (YES) is obtained in step Q2-5, step Q2-6 is implemented to set the present duty ratio command value DSLUi to a value D3. In the control phase PH3, the linear control value SLU is controlled to prevent an abrupt engagement of the brake B3 due to a residual hydraulic pressure at the end of the fast fill of the hydraulic cylinder 52, that is, when the piston of the hydraulic cylinder 52 has reached the engaging stroke end. The value D2 is determined to lower the engaging pressure $P_{B3}$ of the hydraulic cylinder 52 to a predetermined low level, which is a predetermined standby pressure level plus a predetermined small value α. At the standby pressure level, the piston of the hydraulic cylinder 52 is held located close to the engaging stroke end, but the brake B3 is not in the fully engaged state.

If a negative decision (NO) is obtained in step Q2-5, the control flow goes to step Q2-7 to determine whether the control phase PH4 is presently selected. If an affirmative decision (YES) is obtained in step Q2-7, step Q2-8 is implemented to set the present duty ratio command value DSLUi to a value determined by the following equation (4):

$$DSLUi=\{(D4-D3/T4)\times Tim4+D3 \tag{4}$$

In the control phase PH4 initiated after the piston of the hydraulic cylinder 52 has reached the engaging stroke end, the linear control valve SLU is controlled to raise the engaging pressure $P_{B3}$ to a transition level $P_{B3}^*$ (indicated in FIG. 19) which is immediately below the level at which the automatic transmission 14 has entered the inertia phase. To this end, a feed-forward control of the duty ratio command value DSLUi is effected to rapidly raise the command value DSLUi, during a predetermined length of time T4, to the transition point value D4 which corresponds to the transition level $P_{B3}^*$ of the pressure $P_{B3}$. A sweep time SW1 indicated in FIG. 19 in relation to the command value DSLU corresponds to the control phase PH4. The time length T4 is determined taking account of the response time delay DL, so that the hydraulic pressure $P_{B3}$ has been raised to the transition level $P_{B3}^*$ corresponding to the transition point command value D4 before the automatic transmission 14 has entered the inertia phase. The transition point command value D4 and the time length T4 are represented by suitable mathematical equations or data maps stored in the ROM of the transmission controller 178. These equations and data maps include suitable parameters such as the operating amount $A_{CC}$ of the accelerator pedal 140 or the opening angle $\theta_{TH}$ of the throttle valve 156, which reflects the input torque of the automatic transmission 14.

If a negative decision (NO) is obtained in step Q2-7, the control flow goes to step Q2-9 to determine whether the presently selected control phase PH is PH5 or PH7. If an affirmative decision (YES) is obtained in step Q2-9, the control flow goes to step Q2-10 to set the present duty ratio command value DSLUi to a value determined by the following equation (5):

$$DSLUi=(DSLUi-1+\Delta D5) \tag{5}$$

In the control phases PH5 and PH7, a feed-forward control of the present duty ratio command value DSLUi is effected to increase the present duty ratio command value DSLUi at a predetermined rate ΔD5 which is lower than the rate at which the command value DSLUi is increased in the control phase PH4, so that the input shaft speed $N_{CO}$ can be changed at a rate as high as possible while preventing a shifting shock of the automatic transmission 14 due to a change in the input shaft speed $N_{CO}$. In the above equation (5), the value DSLUi-1 is the duty ratio command value obtained in the last cycle of execution of the routine of FIG. 17. The rate ΔD5 may be considered an increment of the duty ratio command value DSLUi for each cycle of execution of the routine of FIG. 17. In the example of FIG. 19 wherein the control phase PH5 established before the automatic transmission 14 has entered the inertia phase is followed by the control phase PH7, a sweep time SW2 corresponds to the control phase PH5 (before the point of time t2) and the control phase PH7 (after the point of time t2).

If a negative decision (NO) is obtained in step Q2-9, the control flow goes to step Q2-11 to determine whether the control phase PH6 is presently selected. If an affirmative decision (YES) is obtained in step Q2-11, the control flow goes to step Q2-12 to set the present duty ratio command value DSLUi to a value determined by the following equation (6):

$$DSLUi=DSLUi-1+\Delta D6 \tag{6}$$

It will be understood from step Q1-10, Q1-11 and Q1-12 of FIG. 16 that the control phase PH6 is selected where the automatic transmission 14 has not entered the inertia phase even after the predetermined time length T5 has passed after the moment of selection of the control phase PH5. In the control phase 6, a feed-forward control of the present duty ratio command value DSLUi is effected to increase the duty ratio command value DSLUi at a rate ΔD6 higher than the rate ΔD5 used in the control phase PH5, so that the automatic transmission 14 enters the inertial phase as soon as possible. The like the rate ΔD5, the rate ΔD6 may be considered to be an increment of the duty ratio command value DSLUi. However, the control phase PH6 may be omitted.

If a negative decision (NO) Is obtained in step Q2-11, the control flow goes to step Q2-13 to determine whether the control phase PH8 is presently selected. If an affirmative decision (YES) is obtained in step Q2-13, the control flow goes to step Q2-14 to set the present duty ratio command value DSLUi to a value determined by the following equation (7):

$$DSLUi=DSLUi-1+\Delta D8 \tag{7}$$

In the control phase PH8, a feed-forward control of the command value DSLUi is effected to reduce the command value DSLUi at a predetermined rate ΔD8, so as to prevent an increase of the output torque when the input shaft speed $N_{CO}$ has approached the post-upshift synchronization speed, namely, in the terminal part of the engaging action of the brake B3. The rate ΔD8 may be considered to be a decrement of the command value DSLUi.

If a negative decision (NO) is obtained in step Q2-13, the control flow goes to step Q2-15 to determine whether the control phase PH9 is presently selected. If an affirmative decision (YES) is obtained in step Q2-15, the control flow goes to step Q2-16 to set the present duty ratio command value DSLUi to a value determined by the following equation (8):

$$DSLUi=DSLUi-1+\Delta D9 \qquad (8)$$

In the control phase PH9, a feed-forward control of the duty ratio command value DSLUi is effected to increase the command value DSLUi at a predetermined rate ΔD9, for raising the hydraulic pressure $P_{B3}$ to the line pressure PL, after the input shaft speed $N_{CO}$ has reached the synchronizing speed and after the upshift of the automatic transmission 14 from the position "1" to the position "2" is completed with full engagement of the brake B3. In FIG. 19, point of time t3 is a moment at which the input shaft speed $N_{CO}$ has reached the synchronizing speed and the brake B3 has been substantially fully engaged. Namely, the automatic transmission 14 has been shifted up from the first-speed position "1st" to the second-speed position "2nd" at the point of time t3. The control phase PH9 is selected at a point almost coincident with the point of time t3. Like the rates ΔD5 and ΔD6, the rate ΔD9 may be considered to be an increment of the command value DSLUi.

Figure 20:
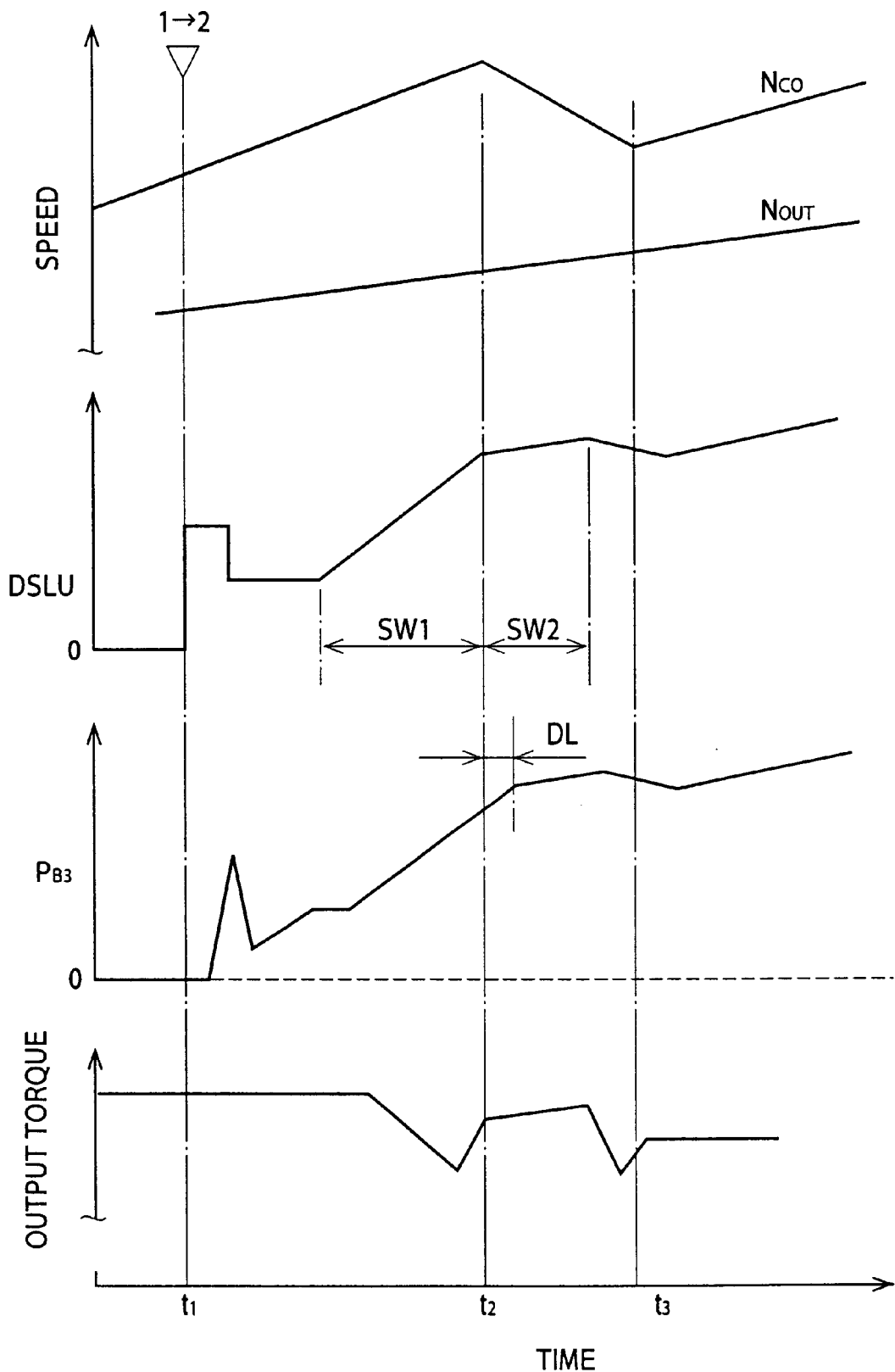
FIG. 20 is a time chart corresponding to that of FIG. 19, when the direct control of the pressure of the brake B3 is effected by feedback control.

In the present embodiment which has been described above, the feed-forward control of the duty ratio command value DSLU is effected in the torque phase (corresponding to the sweep time SW1) and in the inertia phase (corresponding to the sweep time SW2) of the automatic transmission 14, to control the rates of change of the hydraulic pressure $P_{B3}$ of the hydraulic cylinder 52 in the torque and inertia phases. That is, the feed-forward control of the duty ratio of the linear solenoid valve SLU is effected in the torque phase as well as in the inertia phase, so that the shifting shock of the transmission 14 due to the response delay DL and the deterioration of the friction members of the brake B3 can be reduced in the present arrangement, as compared with an arrangement wherein the rate of change of the hydraulic pressure $P_{B3}$ is controlled after the initiation of the inertia phase is detected on the basis of a change in the input shaft speed $N_{CO}$, as indicated in FIG. 20, or an arrangement wherein a feedback control of the hydraulic pressure is effected in the inertia phase so that the input shaft speed $N_{CO}$ is changed at a predetermined rate. If the rate of increase of the hydraulic pressure $P_{B3}$ in the torque phase were lowered for the purpose of reducing the influence of the response delay DL, the time duration of the torque phase would be increased, undesirably deteriorating the smoothness of the shifting action of the automatic transmission 14 and the durability of the friction members of the brake B3. The present embodiment makes it possible to control the hydraulic pressure $P_{B3}$ without lowering the rate of increase of the pressure $P_{B3}$ in the torque phase and without adverse influences of the response delay DL.

Figure 21:
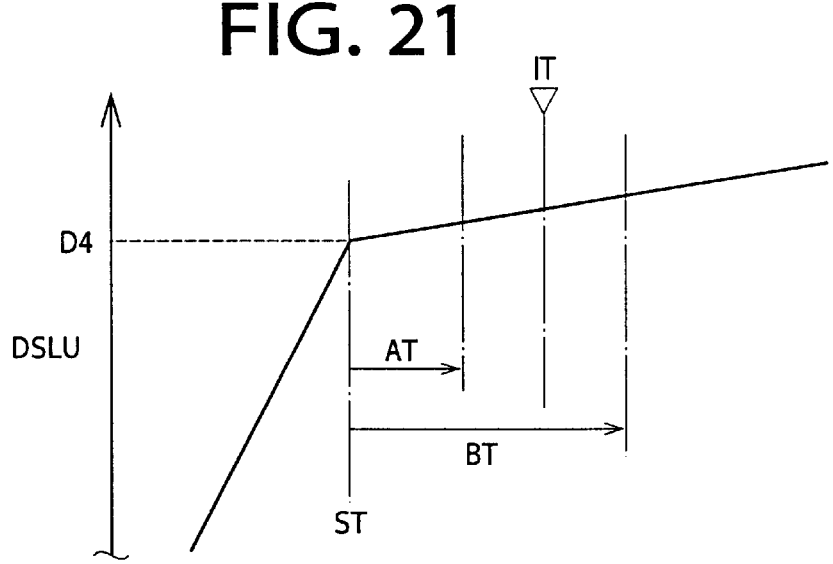
FIG. 21 is a view for explaining a learning compensation of a transition point command value D4 in the direct control of the pressure of the brake B3 according to the routines of FIGS. 16 and 17.

Further, the above-indicated transition point command value D4 corresponding to the transition level $P_{B3}^*$ of the hydraulic pressure $P_{B3}$ is subjected to a learning compensation, so that the rate of change of the hydraulic pressure $P_{B3}$ in the torque phase corresponding to the sweep time SW1 can be switched to that in the inertia phase corresponding to the sweep time SW2, at an appropriate timing irrespective of a chronological change of the characteristics of the power transmitting system or a difference in the characteristics among power transmitting systems of the individual vehicles. Described more specifically, the data map which is stored in the memory device 188 and used to determine the transition point command value D4 on the basis of the throttle opening angle $\theta_{TH}$ is updated or compensated so that the automatic transmission 14 enters the inertia phase at a point of time IT, as indicated in FIG. 21, wherein "ST" represents a point of time at which the duty ratio command value DSLU has been increased to the transition point value D4, and "AT" and "BT" respectively represent permissible shortest and longest times from the point of time ST, during which the inertia phase is initiated. That is, the learning compensation of the transition point command value D4 permits the automatic transmission 14 to enter the inertia phase at the point of time IT which is intermediate between the moments of expiration of the permissible shortest and longest times AT and BT from the point of time ST. The point of time ST is a moment at which the control in the control phase PH4 is terminated and the affirmative decision (YES) is obtained in step Q1-8, while the point of time IT is a moment at which the affirmative decision (YES) is obtained in step Q1-12.

The learning compensation of the transition point command value D4 will be described more specifically by reference to FIGS. 22A, 22B and 22C.

Figure 22A:
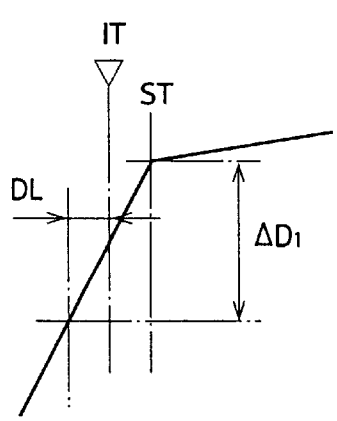
FIGS. 22A, 22B and 22C are views for explaining details of the learning compensation of FIG. 21.

In the case of FIG. 22A, the automatic transmission 14 has entered the inertia phase prior to the point of time ST. In this case, the compensating amount (a negative value in this case) of the transition point command value D4 is calculated according to a predetermined mathematical equation, on the basis of the hydraulic pressure $P_{B3}$ at the point of time IT as adjusted by the response delay DL, that is, on the basis of a difference ΔD1 between the present transition point command value D4 and the duty ratio command value DSLU at a point of time which is prior to the point of time IT by the response delay DL. The data map stored in the memory device 188 to obtain the transition point command value D4 on the basis of the throttle opening angle $\theta_{TH}$ is compensated or updated on the basis of the calculated compensating amount. The mathematical equation may be formulated such that the absolute value of the compensating amount (negative value in this case) increases with an increase in the difference ΔD1.

Figure 22B:
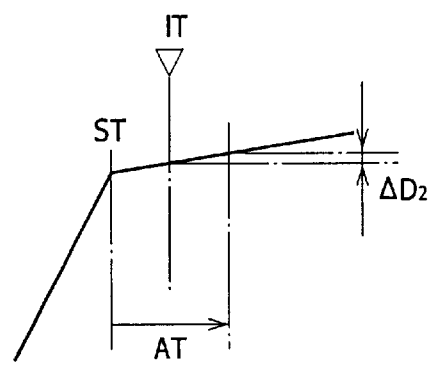

In the case of FIG. 22B, the automatic transmission 14 has entered the inertia phase at a point of time between the point of time ST and the moment of expiration of the permissible shortest time AT. In this case, the compensating amount (a negative value in this case) of the transition point command value D4 is calculated according to a predetermined mathematical equation, on the basis of a difference ΔD2 between the command values DSLU at the point of time IT and at the moment of expiration of the permissible shortest time AT. On the basis of the calculated compensating amount, the data map stored in the memory device 188 to obtain the transition point command value D4 on the basis of the throttle opening angle $\theta_{TH}$ is compensated or updated. The mathematical equation may be formulated such that the absolute value of the compensating amount increases with an increase in the difference ΔD2.

Figure 22C:
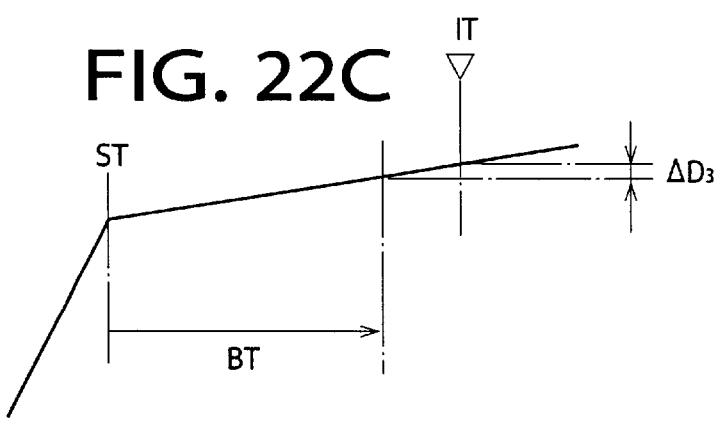

In the case of FIG. 22C, the automatic transmission 14 has entered the inertia phase at a point of time after the moment of expiration of the permissible longest time BT. In this case, the compensating amount (a positive value in this case) of the transitional point command value D4 is compensated according to a predetermined mathematical equation, on the basis of a difference ΔD3 between the command values DSLU at the moment of expiration of the permissible longest time BT and the point of time IT. On the basis of the calculated compensating amount, the data map stored in the memory device 188 to obtain the transition point command value D4 on the basis of the throttle opening angle $\theta_{TH}$ is compensated or updated. The mathematical equation may be formulated such that the compensating amount (positive value) increases with an increase in the difference ΔD3. It is noted that two different mathematical equations may be used to calculate the compensating amount, depending upon whether the control phase PH6 has been selected or not.

Where the point of time IT at which the automatic transmission 14 has entered the inertia phase is intermediate between the moments of expiration of the permissible shortest and longest times AT and BT from the point of time ST at which the present transition point command value D4 has been reached, the transition point command value D4 is not compensated, that is, the data map is not compensated.

Figure 23:
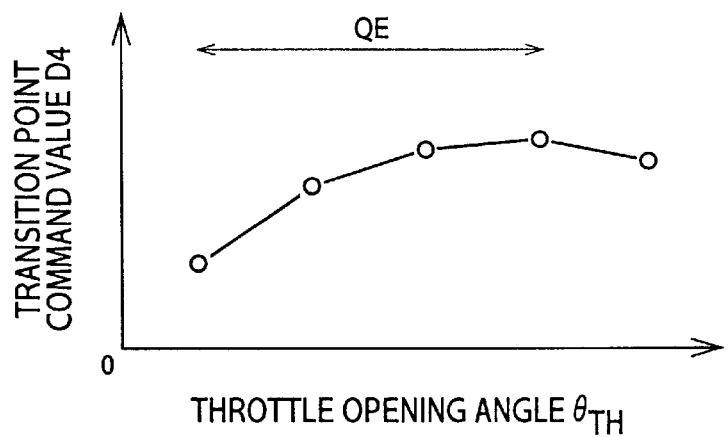
FIG. 23 is a view showing an example of a data map used in the learning compensation of FIG. 21 to obtain the transition point command value D4 on the basis of a throttle opening angle $\theta_{TH}$.
Figure 24A:
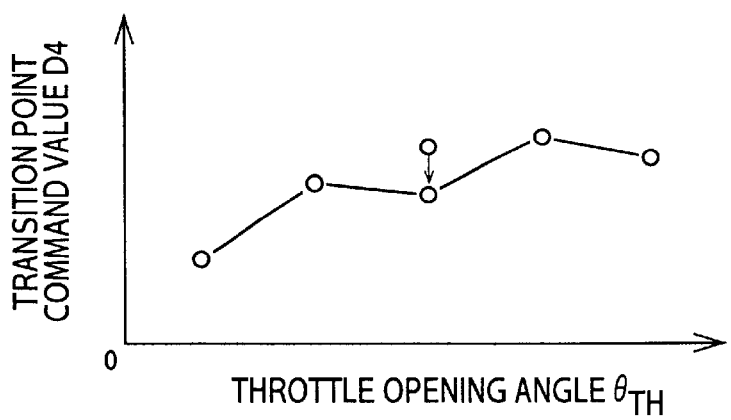
FIGS. 24A and 24B are views indicating changes made to the data map of FIG. 23 by learning compensation.
Figure 24B:
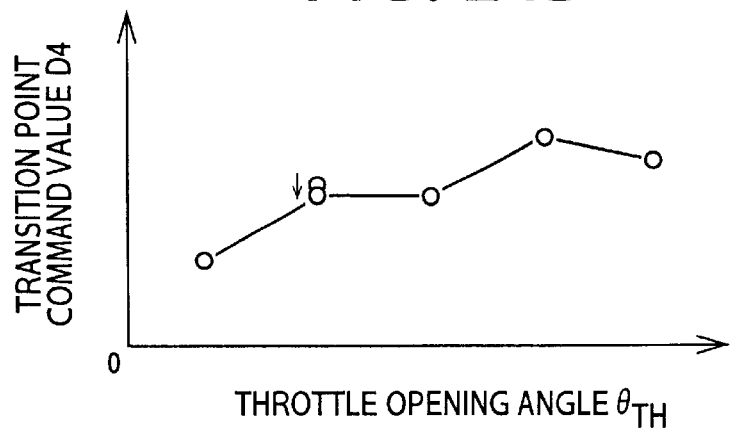

An example of data map for obtaining the transition point command value D4 on the basis of the throttle opening angle $\theta_{TH}$ is shown in FIG. 23. This data map represents a predetermined relationship between the command value D4 and the throttle opening angle $\theta_{TH}$, wherein the command value D4 gradually increases with the throttle opening angle $\theta_{TH}$, within a range QE of the throttle opening angle. To update the data map, it is desirable to compensate the data map so as to maintain the pattern of change of the command value D4 with the throttle opening angle $\theta_{TH}$, which pattern is defined by the original data map. Namely, it is desirable that the updated or compensated data map maintains a pattern of increase of the command value D4 with the throttle opening angle $\theta_{TH}$ within the range QE. If the data map is updated to reduce the command value D4 corresponding to a given value of the throttle opening angle $\theta_{TH}$, as indicated in FIG. 24A, the original pattern of increase would be lost. Therefore, when the data map is updated as indicated in FIG. 24A, the data map is updated to reduce the command value D4 corresponding to another value of the throttle opening angle, so that the updated data map represents a pattern of increase of the command value D4 with the throttle opening angle $\theta_{TTH}$, which is similar to that of the original data map.

The learning compensation of the transition point command value D4 effected as described above assures that the automatic transmission 14 enters the inertia phase at the appropriate point of time IT with respect to the point of time ST, irrespective of a difference in the characteristics among the power transmitting systems of the individual vehicles or a chronological change of the characteristics of the power transmitting system of each vehicle, which difference or chronological change would otherwise cause a variation in the point of time IT at which the inertia phase is established, unfavorably resulting in a shifting shock of the transmission 14 and deterioration of the friction members of the brake B3.

It is also noted that the appropriate standby hydraulic pressure at which the piston of the hydraulic cylinder 52 of the brake B3 can be kept close to the engaging stroke end can be obtained by learning, by subtracting the pressure value corresponding to the input torque of the automatic transmission 14, from the transition point hydraulic pressure $P_{B3}$* (corresponding to the transition point command value D4) when the throttle valve 156 is placed in the substantially fully closed position.

Since the present arrangement is effective to reduce a variation in the point of time IT at which the automatic transmission 14 enters the inertia phase, the use of the input shaft speed sensor and the vehicle speed sensor makes it possible to detect the transition from the torque phase to the inertia phase, with high accuracy, so that the detection of the transition can be utilized for various controls, for instance, for reducing the torque immediately before the initiation of the inertia phase. Namely, the present arrangement does not require an exclusive sensor for detecting the torque phase, leading to a reduced cost of manufacture of the control apparatus for the power transmitting system.

In addition, the learning compensation to optimize the transition point command value D4 (transition level $P_{B3}$* of the hydraulic pressure $P_{B3}$) makes it possible to reduce shocks or variations when the optimized command value D4 is used to effect other controls, for example, a control to be performed when the operating amount $A_{CC}$ of the accelerator pedal 150 is changed during a shifting action of the transmission 14, or when the brake B3 is engaged after it is released.

It is possible to effect learning compensation of the sweep time T4 while holding constant the rate of increase of the hydraulic pressure $P_{B3}$ (duty ratio command value DSLU) in the control phase PH4, or effect learning compensation of the rate of increase of the hydraulic pressure $P_{B3}$ (command value DSLU) while holding constant the sweep time T4.

Figure 25:
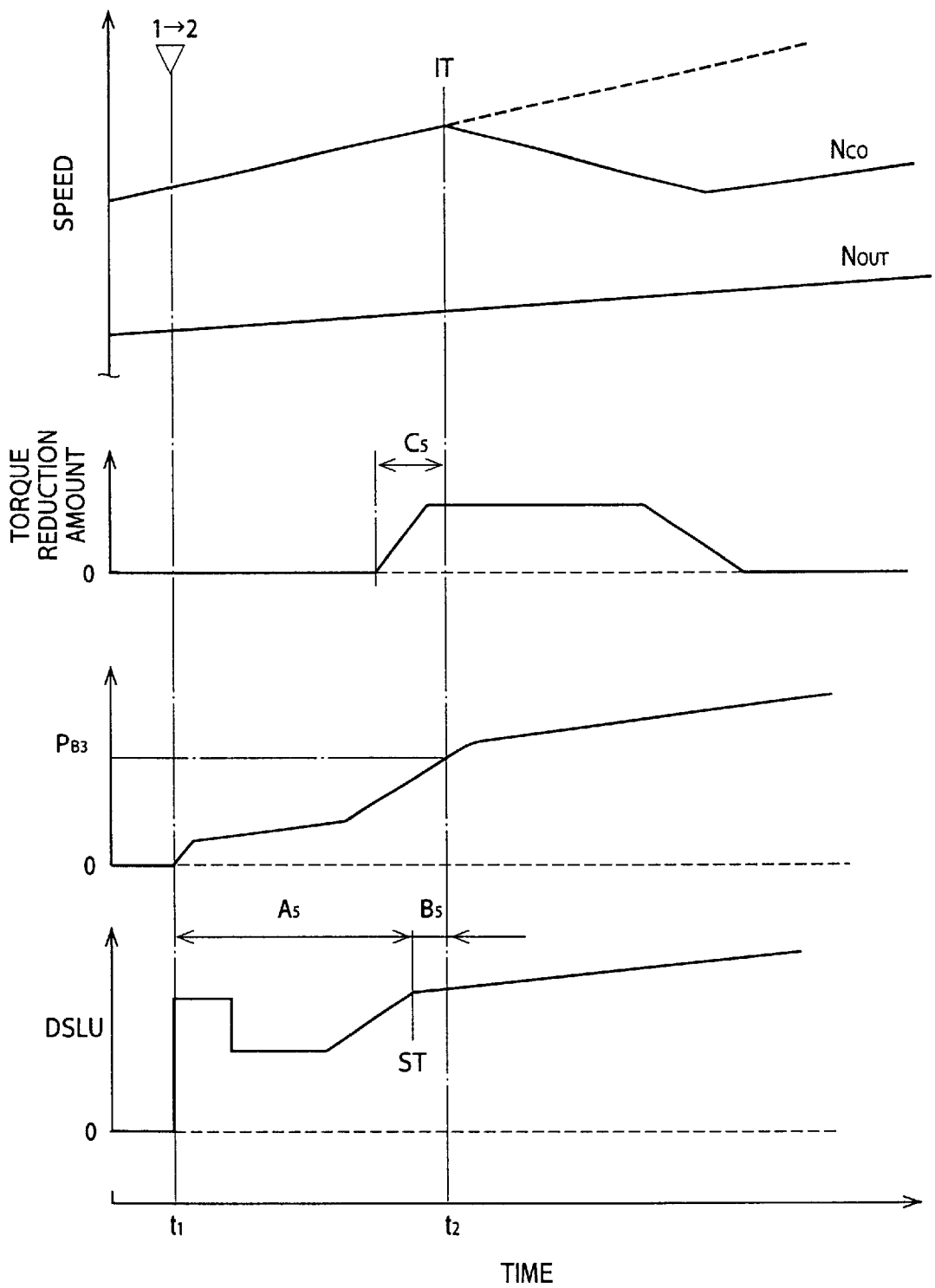
FIG. 25 is a time chart illustrating changes of various parameters, by way of example, when the 1-2 upshift is controlled so as to effect a torque reduction control.

The time chart of FIG. 25 shows changes of various parameters when the torque of the engine 10 is reduced in the process of the 1-2 upshift described above by reference to FIGS. 16–24. The shifting shock in the 1-2 upshift can be minimized, and the durability of the friction members of the brake B3 can be improved, by initiating the reduction of the engine torque before the expected moment of initiation of the inertia phase, and gradually increasing the amount of reduction of the engine torque, as indicated in FIG. 25. This control of the engine torque is based on the learning compensation of the transition point command value D4 described above, or the learning compensation of the time length T4 or the rate of increase of the duty ratio command value DSLU (rate of increase of the hydraulic pressure $P_{B3}$ of the hydraulic cylinder 52 of the brake B3) in the control phase PH4. In other words, the control of the engine torque is based on the learning compensation of the direct control of the hydraulic pressure of the hydraulic cylinder 52 such that the inertia phase is always initiated a suitable time after the point of time ST at which the command value DSLU has reached the transition point value D4.

Described in detail referring to the time chart of FIG. 25, a time length (A5+B5) from the point of time t1 at which the 1-2 upshift is commanded to the point of time IT at which the inertia phase is initiated is first estimated, and a point of time at which the reduction of the torque of the engine 10 should be initiated is determined by subtracting a predetermined time length C5 from the estimated time length (A5+B5). That is, the engine torque reduction is initiated when a time length (A5+B5−C5) which is equal to a difference between the time length (A5+B5) and the tile length C5 has passed after the point of time t1. The time length A5 is a sum of the predetermined time lengths T2, T3 and T4, and expires when the control phase PH4 is terminated. The time length B5 is a time length between the points of time ST and IT. Where the transition point command value D4 is subjected to the learning compensation as indicated in FIGS. 21 and 22, the time length B5 may be selected to be equal to an average value (AT+BT)/2 of the permissible shortest and longest times AT and B5. For effectively preventing the deterioration of durability of the friction members of the brake B3, the time length B5 is preferably equal to the permissible shortest time AT. The torque of the engine 10 can be reduced by reducing the opening angle $\theta_{TH}$ of the throttle valve 156, for example.

The above arrangement permits adequate reduction of the input torque of the automatic transmission 10, which greatly influences the durability of the friction members of the brake B3 in the neighborhood of the point of time IT at which the inertia phase is initiated.

Since the reduction of the engine torque is initiated before the point of time IT, a relationship that the engaging torque of the brake B3 is larger than the input torque of the transmission 14 can be established shortly after the initiation of the engine torque reduction, even if the engaging hydraulic pressure $P_{B3}$ of the hydraulic cylinder 54 is lowered to some extent. Accordingly, the above arrangement assures both an improvement in the durability of the brake B3 and a reduced shifting shock of the transmission 14 shortly after the initiation of the engine torque reduction, so that the required number of the friction members of the brake B3 can be reduced, resulting in a reduced cost of the brake B3 while assuring a high degree of its durability.

Further, since the reduction of the engine torque is initiated before the estimated point of time at which the inertial phase is initiated, namely, when the time (A5+B5−C5) has passed after the 1-2 upshift is commanded, the engine torque can be effectively reduced in a feed-forward fashion while taking into account a control delay, even where the engine torque reduction is effected by controlling of the throttle valve 156, which generally suffers from a relatively low control response. Although the engine torque reduction by reducing the opening angle $\theta_{TH}$ of the throttle valve 156 does not have a high control response, the engine torque can be reduced by the throttle valve 156 with relatively high reliability and stability.

Figure 26:
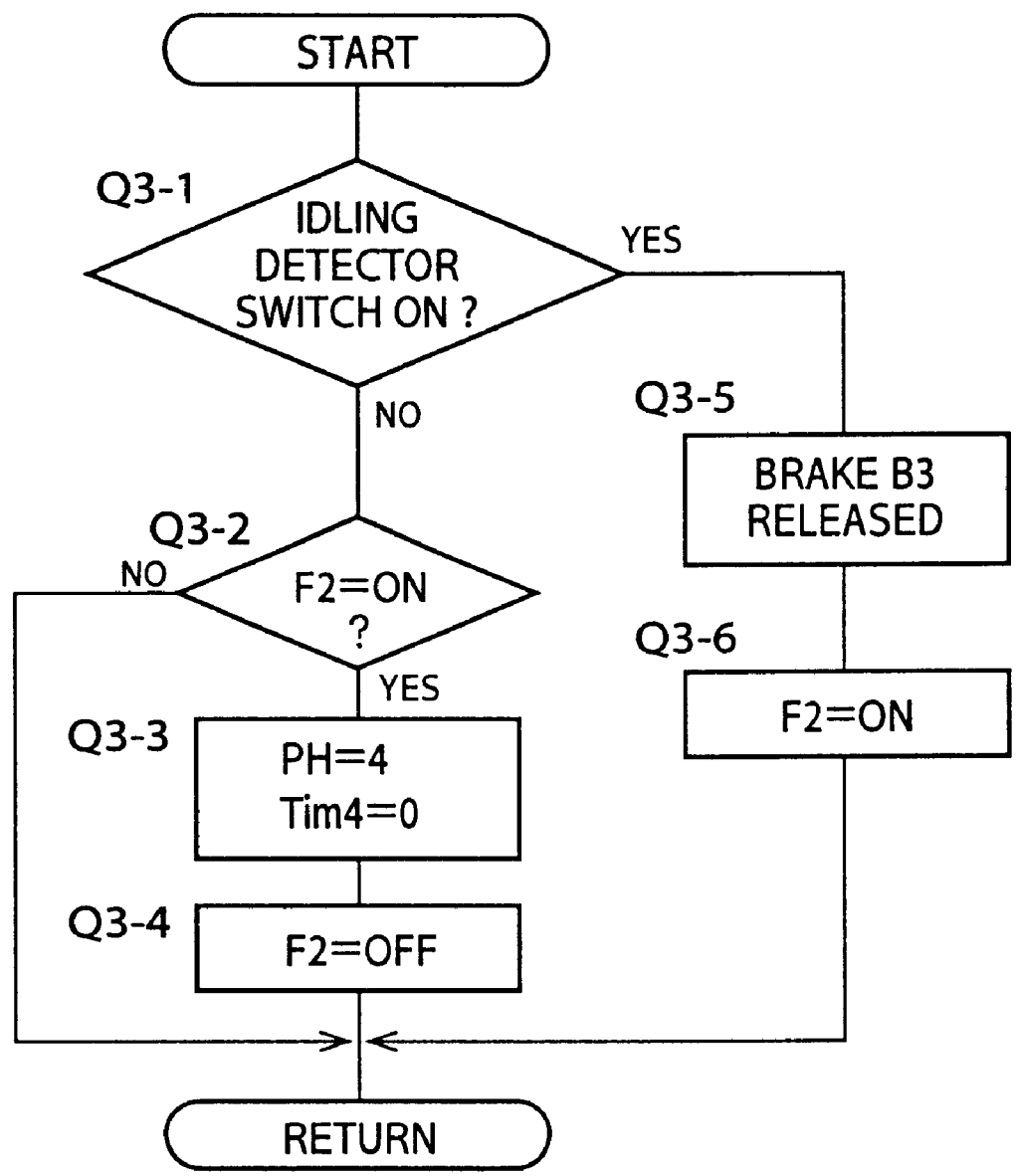
FIG. 26 is a flow chart illustrating a routine for releasing the brake B3 upon an operation of an accelerator pedal, when the pressure of the brake B3 is directly controlled in the 1-2 upshift according to the routines of FIGS. 16 and 17.
Figure 27:
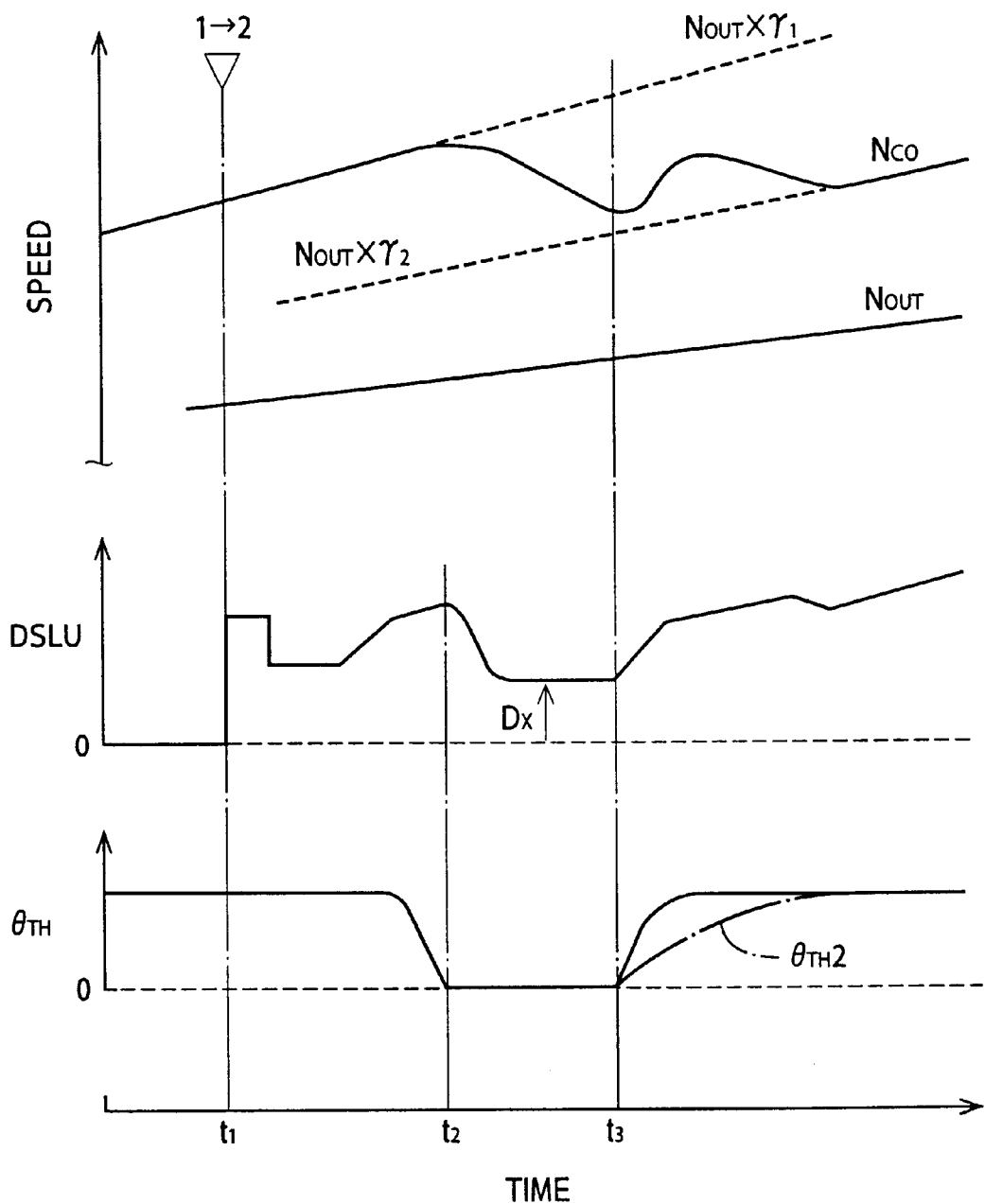
FIG. 27 is a time chart showing changes of various parameters when the routine of FIG. 26 is executed.

The flow chart of FIG. 26 illustrates a routine executed by the transmission controller 176 for controlling the engaging state of the brake B3 depending upon whether the vehicle is in the POWER-OFF state or not, in the process of the 1-2 upshift controlled according to the routines of FIGS. 16 and 17 and as described above by reference to FIGS. 18–25. The routine is repeatedly executed with a predetermined cycle type. The time chart of FIG. 27 shows changes of various parameters when the routine of FIG. 26 is executed, where the 1-2 upshift is commanded at the point of time t1 while the vehicle is placed in a POWER-ON state with the throttle valve 156 being open, and the 1-2 shift valve 70 is switched to substantially fully close the throttle valve 156 at the point of time t2. At the point of time t3, the accelerator pedal 150 is again operated to open the throttle valve 156.

It will be understood that the brake B3 is a frictional coupling device which is engaged by the hydraulic cylinder 52 to establish the 1-2 upshift, and that the linear solenoid valve SLU and the B3 control valve 78 for controlling the hydraulic pressure $P_{B3}$ of the hydraulic cylinder 52 constitute a pressure regulating device adapted to supply a pressurized fluid to the hydraulic cylinder 52 and controlling the hydraulic pressure $P_{B3}$ to control an engaging action of the frictional coupling device.

The routine of FIG. 26 is executed while the routines of FIGS. 16 and 17 are executed. The routine of FIG. 26 is initiated with step Q3-1 to determine whether the idling detector switch of the throttle sensor 164 is on. If the idling detector switch is on, that is, the throttle valve 156 is fully closed with the accelerator pedal 150 placed in the non-operated position, the control flow goes to step Q3-5 to release the brake B3, and then to step Q3-6 to turn on a flag F2. In step Q3-5, the hydraulic pressure $P_{B3}$ of the hydraulic cylinder 52 is held at a relatively low standby level by the linear solenoid valve SLU, so that the piston is held at a standby position close to the engaging stroke end, but the brake B3 is not engaged. To this end, the duty ratio command value DSLU is set to be a standby value Dx, which is equal the transition point value D4 corresponding to the substantially zeroed throttle opening angle $\theta_{TH}$, minus a value corresponding to the input torque of the automatic transmission 14. Since the transition point command value D4 is subjected to the learning compensation as described above, the piston of the hydraulic cylinder 52 can be held at its standby position indicated above, with high accuracy and stability. Step Q3-5 is implemented while interrupting the routines of FIGS. 16 and 17. In the specific example of FIG. 27, step Q3-5 is implemented in the control phase PH5 or PH7, to reduce the duty ratio command value DSLU to the standby value Dx.

If a negative decision (NO) is obtained in step Q3-1, that is, if the idling detector switch is off with the accelerator pedal 150 being operated, the control flow goes to step Q3-2 to determine whether the flag F2 is on. Since the flag F2 is initially reset to off, a negative decision (NO) is obtained in step Q3-2 if step Q3-1 is implemented for the first time where the 1-2 upshift is commanded while the accelerator pedal 150 is in operation. If the accelerator pedal 150 is operated in the process of the 1-2 upshift initiated while the accelerator pedal 150 is not in operation, the flag F2 is on, and the control flow goes to step Q3-3. This step Q3-3 is implemented also if the accelerator pedal 150 is operated after it is once released in the process of the 1-2 upshift initiated with the accelerator pedal 150 placed in an operated position.

In step Q3-3, the control phase PH4 is established, and the timer Tim4 is reset to measure a time. Step Q3-3 is followed by step Q3-4 to turn off the flag F2, so that the direct control of the hydraulic pressure $P_{B3}$ is then effected according to the routines of FIGS. 16 and 17, starting with the control phase PH4.

Generally, the throttle opening angle $\theta_{TH}$ abruptly increases as shown in FIG. 27 when the accelerator pedal 150 is operated. In this case of an abrupt increase of the throttle opening angle $\theta_{TH}$ with an increase in the operating amount $A_{CC}$ of the accelerator pedal 150, the transition point command value D4 is determined on the basis of a compensated throttle opening angle $\theta_{TH2}$ indicated by one-dot chain line in FIG. 27. The compensated throttle opening angle $\theta_{TH2}$ is obtained by smoothing the throttle opening angle $\theta_{TH}$.

Figure 28A:
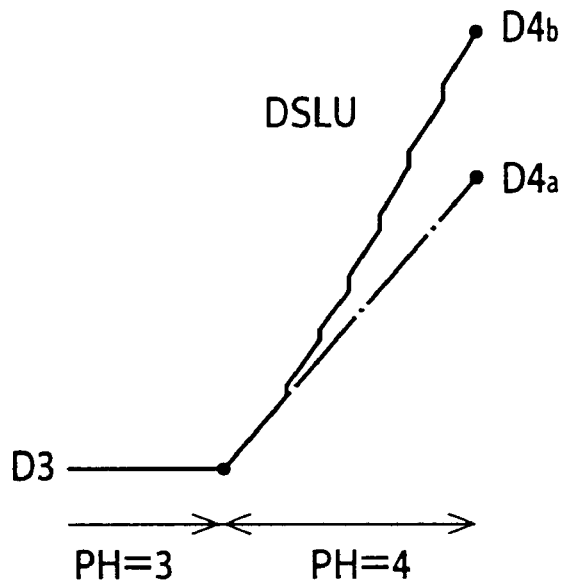
FIGS. 28A and 28B are views showing a change of the throttle valve opening angle $\theta_{TH}$ upon determination of a duty ratio command value DSLUi in step Q2-8 of the routine of FIG. 17, FIG. 28A indicating a change of the command value DSLU, while FIG. 28B indicating a relationship between the transition point command value D4 and the throttle valve opening angle $\theta_{TH}$.

Further, the present duty ratio command value DSLUi in the control phase PH4 is calculated by obtaining the transition point command value D4 and solving the above equation (4) using the obtained value D4. The transition point command value D4 is obtained on the basis of the throttle opening angle $\theta_{TH}$, in each cycle of execution of the routine of FIG. 17, in order to adequately control the pressure $P_{B3}$ of the hydraulic cylinder 52 of the brake B3, irrespective of a change in the operating amount $A_{CC}$ of the accelerator pedal 150. Solid line in FIG. 28A shows an example of a change of the duty ratio command value DSLU where the throttle opening angle $\theta_{TH}$ (or compensated throttle opening angle $\theta_{TH2}$) is changed from $\theta_{THa}$ to $\theta_{THb}$ in the control phase PH4. Initially, the transition point command value D4a corresponding to the initial throttle opening angle $\theta_{TH}$ is used to calculate the present duty ratio command value DSLUi, as indicated by broken line. As the throttle opening angle $\theta_{TH}$ is increased, the transition point command value D4 is increased. When the throttle opening angle $\theta_{TH}$ (compensated value $\theta_{TH2}$) has been increased to $\theta_{THb}$, the transition point command value D4b is used to calculate the present duty ratio command value DSLUi, as indicated by solid line. According to this arrangement, the duty ratio command value DSLU can be increased to the adequately determined transition point value D4, even where the throttle opening angle $\theta_{TH}$ is changed. The inertia phase is initiated in a suitably timed relation with the point of time ST at which the command value DSLU has reached the transition point value D4.

Figure 28B:
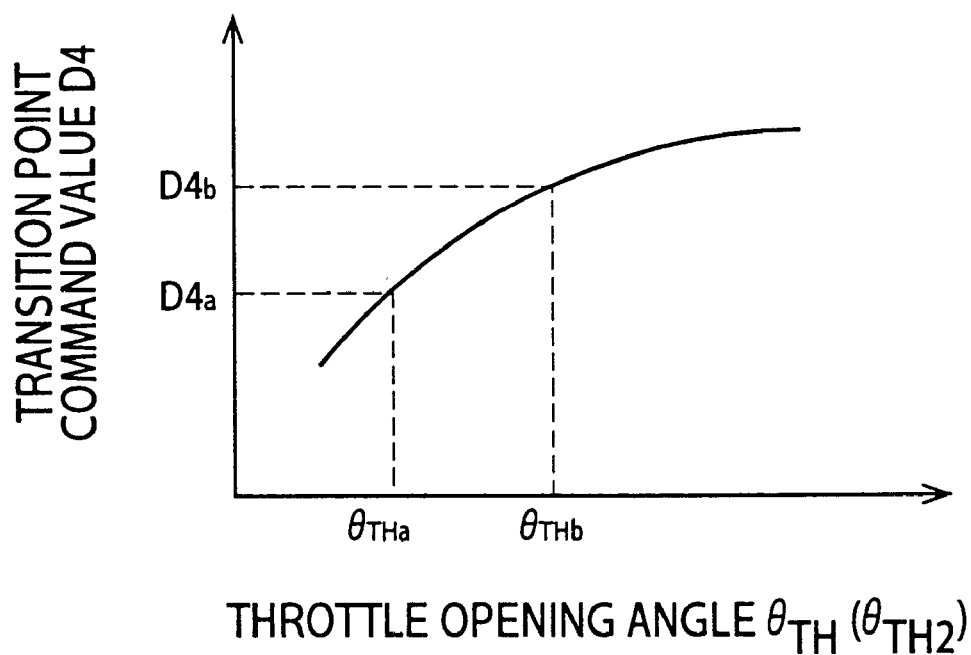

FIG. 28B shows an example of a data map used to determine the transition point command value D4 on the basis of the throttle opening angle $\theta_{TH}$. When the accelerator pedal 150 is depressed, the throttle opening angle $\theta_{TH}$ is accordingly changed. However, an actual increase in the output of the engine 10 is delayed with respect to an increase in the throttle opening angle $\theta_{TH}$. In this respect, it is desirable to compensate the throttle opening angle $\theta_{TH}$ by a suitable smoothing amount corresponding to the delay of the engine output increase, so that the transition point command value D4 is calculated on the basis of the compensated throttle opening angle.

In the present third embodiment, the brake B3 is engaged with the hydraulic cylinder 52 supplied with the pressurized fluid, in the process of the 1-2 upshift of the automatic transmission 14, while the accelerator pedal 150 is in operation. However, the brake B3 is released when the accelerator pedal 150 is released in the process of the 1-2 upshift. This arrangement prevents the application of an engine brake to the vehicle and consequent unexpected deceleration of the vehicle, even in the absence of an one-way clutch for the 1-2 upshift. That is, if the brake B3 were engaged while the clutch C0 is held in the engaged state, an engine braking force (negative torque) would be transmitted from the vehicle drive wheels to the engine 10 through the automatic transmission 14, as the speed of the engine 10 is lowered. If the clutch C0 were released, the engine brake would not be applied, owing to a slipping action of the one-way clutch F0. In the present embodiment wherein the brake B3 is released when the accelerator pedal 150 is released, the input speed $N_{CO}$ is permitted to be lowered down to the synchronizing speed ($N_{OUT} \times \gamma 2$), so as to prevent the application of an engine brake to the vehicle. Therefore, the present embodiment eliminates a need of releasing the clutch C0 in the process of the 1-2 upshift.

When the brake B3 is released as described above, the hydraulic pressure $P_{B3}$ of the pressurized fluid supplied to the hydraulic cylinder 52 is controlled to be the predetermined standby value corresponding to the standby value Dx of the duty ratio command value DSLU, so that the piston of the hydraulic cylinder 52 is held at the standby position close to the engaging stroke end. This arrangement permits a rapid engagement of the brake B3 to establish the second-speed position "2nd" upon operation of the accelerator pedal 150, so that the vehicle drive force can be produced in a short time after the operation of the accelerator pedal 150.

Although the third embodiment applies to the 1-2 upshift of the automatic transmission 14, the routine of FIG. 26 is applicable to a control to release the brake B3 during running of the vehicle while the automatic transmission 14 is placed in the second-speed position "2nd".

While the presently preferred embodiments of this invention as applied to the 2-3 upshift and 1-2 upshift of the automatic transmission 14 have been described above in detail by reference to the accompanying drawings, for illustrative purpose only, the principle of the present invention is equally applicable to other kinds of upshift of the automatic transmission 14, depending upon the specific arrangement of the automatic transmission 14. It is to be understood that the present invention may be embodied with various other changes and improvements which may occur to those skilled in the art, without departing from the spirit and scope of the invention defined in the following claims.

What is claimed is:

1. An apparatus for controlling a power transmitting system of an automotive vehicle, said power transmitting system including (a) an automatic transmission which is shifted up from a presently established lower-gear position to a higher-gear position having a lower speed ratio than said lower-gear position, by an engaging action of a frictional coupling device which is operated by a hydraulic cylinder, and (b) a hydraulic control device for supplying a pressurized fluid to said hydraulic cylinder to effect said engaging action of said frictional coupling device, said apparatus comprising:

synchronizing time estimating means for estimating a synchronizing time required for an input speed of said automatic transmission to reach a synchronizing speed of said higher-gear position, in the process of an upshift of said automatic transmission during running of the vehicle in a power-off state in which a vehicle drive force is not transmitted to drive wheels of the vehicle through said automatic transmission;

a time data memory storing a predetermined stroking time required for a piston of said hydraulic cylinder to reach an engaging stroke end; and timing determining means operable in response to a command to effect said upshift during running of the vehicle in said power-off state, for comparing said synchronizing time with said predetermined stroking time, and thereby determining a point of time at which a supply of said pressurized fluid to said hydraulic cylinder is initiated.

2. An apparatus according to claim 1, wherein said synchronizing time estimating means detects a rate of change of said input speed, obtains said synchronizing speed on the basis of a speed ratio of said higher-gear position and an output speed of said automatic transmission, and calculates said synchronizing time by dividing a difference between the obtained synchronizing speed and said input speed by said rate of change of said input speed.

3. An apparatus according to claim 1, wherein said automatic transmission includes a plurality of rotary elements, and a first brake and a second brake for fixing respective ones of said rotary elements to a stationary housing of said automatic transmission, said lower-gear and higher-gear positions are a second-speed and a third-speed position, respectively, and said upshift is a 2-3 upshift from said second-speed position to said third-speed position, which 2-3 upshift is achieved by engaging said first brake as said frictional coupling device and at the same time releasing said second brake as another frictional coupling device.

4. An apparatus for controlling a power transmitting system of an automotive vehicle, said power transmitting system including (a) an automatic transmission which is shifted up from a presently established lower-gear position to a higher-gear position having a lower speed ratio than said lower-gear position, by an engaging action of a frictional coupling device which is operated by a hydraulic cylinder, and (b) a hydraulic control device for supplying a pressurized fluid to said hydraulic cylinder to effect said engaging action of said frictional coupling device, said apparatus comprising:

input torque limiting means operable in response to an increase in an amount of operation of an accelerating member for accelerating the vehicle, in the process of an upshift of said automatic transmission during running of the vehicle in a power-off state in which a vehicle drive force is not transmitted to drive wheels of the vehicle through said automatic transmission, said input torque limiting means limiting an input torque of said automatic transmission for a predetermined torque limiting time necessary to permit said frictional coupling device to have a torque capacity sufficient to prevent deterioration of durability of said frictional coupling device; and hydraulic pressure compensating means operable when said input torque is limited by said input torque limiting means, for increasing a line pressure of said hydraulic control device to increase a rate at which said pressurized fluid is supplied to said hydraulic cylinder.

5. An apparatus according to claim 4, wherein said torque limiting time during which said input torque is limited by said input torque limiting means even after said increase in the amount of operation of said accelerating member is determined on the basis of a time lapse after a point of time at which the supply of said pressurized fluid to said hydraulic cylinder by said pressure control device is initiated to effect said upshift.

6. An apparatus according to claim 5, wherein said torque limiting time is determined according to a predetermined relationship between said length of time and said time lapse between said point of time at which said supply is initiated and a point of time at which the amount of operation of said accelerating member is increased, such that said torque limiting time decreases with an increase in said time lapse.

7. An apparatus according to claim 4, wherein said line pressure of said hydraulic pressure control device is increased with an increase in the amount of operation of said accelerating member, said hydraulic pressure compensating means increasing said line pressure to a level determined on the basis of said amount of operation of said accelerating member multiplied by a predetermined compensating coefficient larger than 1.

8. An apparatus according to claim 4, wherein said automatic transmission includes a plurality of rotary elements, and a first brake and a second brake for fixing respective ones of said rotary elements to a stationary housing of said automatic transmission, said lower-gear and higher-gear positions are a second-speed and a third-speed position, respectively, and said upshift is a 2-3 upshift from said second-speed position to said third-speed position, which 2-3 upshift is achieved by engaging said first brake as said frictional coupling device and at the same time releasing said second brake as another frictional coupling device.

9. An apparatus for controlling a power transmitting system of an automotive vehicle, said power transmitting system including (a) an automatic transmission which is shifted up from a presently established lower-gear position to a higher-gear position having a lower speed ratio than said lower-gear position, by an engaging action of a frictional coupling device which is operated by a hydraulic cylinder, and (b) a hydraulic control device including a pressure regulating device for supplying a pressurized fluid to said hydraulic cylinder to effect said engaging action of said frictional coupling device, and for controlling a pressure of said pressurized fluid to be supplied to said hydraulic cylinder, said apparatus comprising:

engaging and releasing control means operable in the process of an upshift of said automatic transmission, for controlling said pressure regulating device such that said pressurized fluid is supplied to said hydraulic cylinder to effect said engaging action of said frictional coupling device while an accelerating member for accelerating the vehicle is in operation, and such that a piston of said hydraulic cylinder is held at a standby position close to an engaging stroke end thereof, while said accelerating member is not in operation, said frictional coupling device being placed in a released state thereof when said piston is held at said standby position.

10. An apparatus according to claim 9, wherein said automatic transmission includes a plurality of rotary elements, and a brake for fixing one of said rotary elements to a stationary housing of said automatic transmission, said lower-gear position and said higher-gear position are a first-speed position and a second-speed position, respectively, and said upshift is a 1-2 upshift from said first-speed position to said second-speed position, which 1-2 upshift is achieved by engaging said brake as said frictional coupling device.

* * * * *